United States Patent
Berlatzky et al.

(10) Patent No.: US 12,456,177 B2
(45) Date of Patent: Oct. 28, 2025

(54) SYSTEM AND METHOD FOR DIGITAL OPTICAL ABERRATION CORRECTION AND SPECTRAL IMAGING

(71) Applicant: PXE COMPUTATION IMAGING LTD., Kibbutz Beit Guvrin (IL)

(72) Inventors: Yoav Berlatzky, Kibbutz Beit Gurvin (IL); Yanir Hainick, Tel-Aviv (IL)

(73) Assignee: PXE COMPUTATIONAL IMAGING LTD., Kibbutz Beit Guvrin (IL)

( * ) Notice: Subject to any disclaimer, the term of this patent is extended or adjusted under 35 U.S.C. 154(b) by 409 days.

(21) Appl. No.: 17/924,271

(22) PCT Filed: May 12, 2021

(86) PCT No.: PCT/IL2021/050545
§ 371 (c)(1),
(2) Date: Nov. 9, 2022

(87) PCT Pub. No.: WO2021/229575
PCT Pub. Date: Nov. 18, 2021

(65) Prior Publication Data
US 2023/0177655 A1    Jun. 8, 2023

Related U.S. Application Data

(60) Provisional application No. 63/023,287, filed on May 12, 2020.

(30) Foreign Application Priority Data

Aug. 25, 2020  (IL) .......................................... 276922

(51) Int. Cl.
*G06T 5/73* (2024.01)
*G01J 9/00* (2006.01)
(Continued)

(52) U.S. Cl.
CPC .................. *G06T 5/73* (2024.01); *G01J 9/00* (2013.01); *G06T 5/80* (2024.01); *G06T 7/0002* (2013.01);
(Continued)

(58) Field of Classification Search
CPC ........... G06T 5/73; G06T 5/80; G06T 7/0002; G06T 2207/30168; G01J 9/00; H04N 23/55
See application file for complete search history.

(56) References Cited

U.S. PATENT DOCUMENTS

2015/0125070 A1* 5/2015 Atif .......................... G06T 7/571
382/154
2016/0231549 A1* 8/2016 Bosworth .......... G02B 21/0032
(Continued)

FOREIGN PATENT DOCUMENTS

IN    1383/MUM/2010    9/2011
JP    2016156801 A     9/2016
(Continued)

OTHER PUBLICATIONS

Wigner distribution measurements of the spatial coherence properties of the free electron laser Flash (Year: 2014).*
(Continued)

*Primary Examiner* — Ming Y Hon
*Assistant Examiner* — Amanda H Pearson
(74) *Attorney, Agent, or Firm* — Ballard Spahr LLP

(57) ABSTRACT

There are provided systems and methods for digital optical aberration correction and spectral imaging. An optical system may comprise an optical imaging unit, to form an optical image near an image plane of the optical system; a wavefront imaging sensor unit located near the image plane,
(Continued)

to provide raw digital data on an optical field and image output near the image plane; and a control unit for processing the raw digital data and the image output to provide deblurred image output, wherein the control unit comprises a storage unit that stores instructions and a processing unit to execute the instructions to receive the image input and the raw digital data of the optical field impinging on the wavefront imaging sensor and generate a deblurred image based on an analysis of the optical mutual coherence function at the imaging plane.

16 Claims, 9 Drawing Sheets

(51) Int. Cl.
*G06T 5/80* (2024.01)
*G06T 7/00* (2017.01)
*H04N 23/55* (2023.01)

(52) U.S. Cl.
CPC .............. *G06T 2207/10024* (2013.01); *G06T 2207/30168* (2013.01); *H04N 23/55* (2023.01)

(56) References Cited

U.S. PATENT DOCUMENTS

| | | | |
|---|---|---|---|
| 2018/0324359 A1* | 11/2018 | Pan | H04N 13/207 |
| 2019/0026581 A1* | 1/2019 | Leizerson | G02B 27/0018 |
| 2020/0319031 A1* | 10/2020 | Hong | G01J 3/0256 |
| 2022/0171193 A1* | 6/2022 | Alexeev | G02B 27/4272 |

FOREIGN PATENT DOCUMENTS

| | | |
|---|---|---|
| JP | 2019523910 A | 8/2019 |
| WO | 2012140876 A1 | 10/2012 |
| WO | 2018185740 A1 | 10/2018 |

OTHER PUBLICATIONS

Sahoo, et al., "Single-Shot Multispectral Imaging with a Monochromatic Camera", arxiv.org, Cornell University Library, 201 Olin Library Cornell University, XP081966537, DOI. 10.1364/0PTICA. 4.001209, Jul. 29, 2017, pp. 1-9.

Gabarda, et al., "Multifocus Image Fusion Through Pseudo-Wigner Distribution", Optical Engineering vol. 44 No. 4, Dec. 2005, pp. 047001-1-047001-9.

* cited by examiner

34

```
┌─────────────────────────────────────────────────────────────┐
│ Capturing image with wavefront imaging sensor and generating│
│ raw data. 340                                               │
└─────────────────────────────────────────────────────────────┘
                              ↓
┌─────────────────────────────────────────────────────────────┐
│ Calculating Wigner distribution. 342                        │
│   ┌─────────────────────────────────────────────────────┐   │
│   │ Calculating mutual coherence function. 342a         │   │
│   └─────────────────────────────────────────────────────┘   │
│                          ↓                                   │
│   ┌─────────────────────────────────────────────────────┐   │
│   │ Performing Wigner-Weyl transform. 342b              │   │
│   └─────────────────────────────────────────────────────┘   │
└─────────────────────────────────────────────────────────────┘
                              ↓
┌─────────────────────────────────────────────────────────────┐
│ Separating individual point-sources. 344                    │
└─────────────────────────────────────────────────────────────┘
                              ↓
┌─────────────────────────────────────────────────────────────┐
│ Estimating spatial spectral distribution for each point     │
│ source. 346                                                 │
└─────────────────────────────────────────────────────────────┘
                              ↓
┌─────────────────────────────────────────────────────────────┐
│ Constructing a spatial map of the spectral distribution from│
│ the point-by-point spectral distribution estimates. 348     │
└─────────────────────────────────────────────────────────────┘
                              ↓
┌─────────────────────────────────────────────────────────────┐
│ Optionally calculating blurring of each point source. 350   │
└─────────────────────────────────────────────────────────────┘
                              ↓
┌─────────────────────────────────────────────────────────────┐
│ Optionally estimating the degree of aberration strength for │
│ each point source. 352                                      │
└─────────────────────────────────────────────────────────────┘
                              ↓
┌─────────────────────────────────────────────────────────────┐
│ Optionally reconstructing deblurred image (e.g. as          │
│ composition of deblurred point sources). 354                │
└─────────────────────────────────────────────────────────────┘
                              ↓
┌─────────────────────────────────────────────────────────────┐
│ Optionally, reconstructing a spatial map of the various     │
│ aberration strengths from the point-by-point aberration     │
│ estimates. 356                                              │
└─────────────────────────────────────────────────────────────┘
```

FIG. 3b

FIG. 4
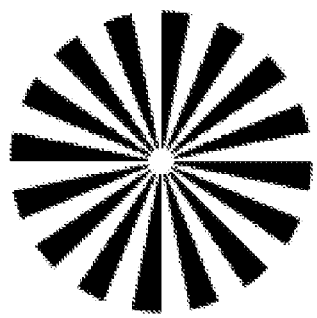
PSF 50
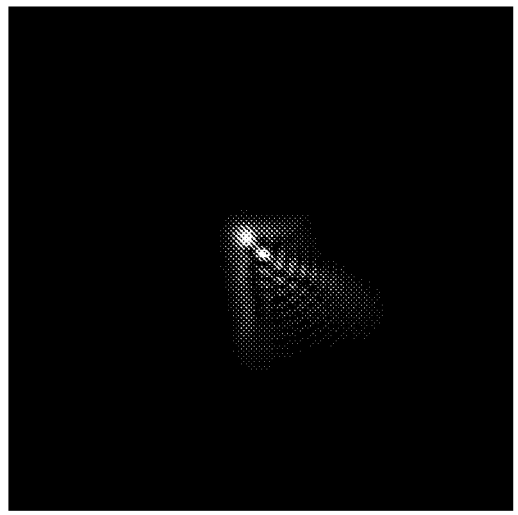
FIG. 5a
Wavefront Error 52
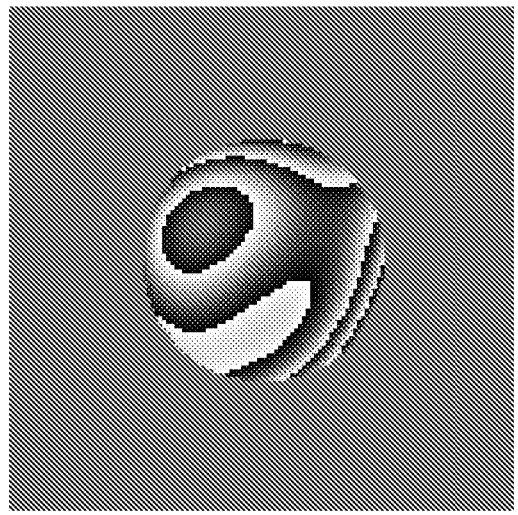
FIG. 5b
Re{$\rho$} 60
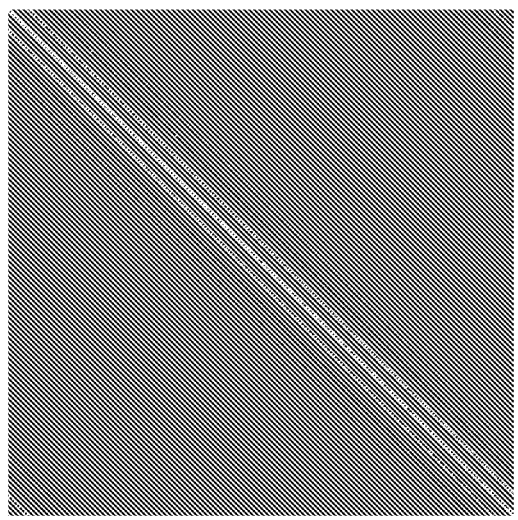
FIG. 6a
Im{$\rho$} 62
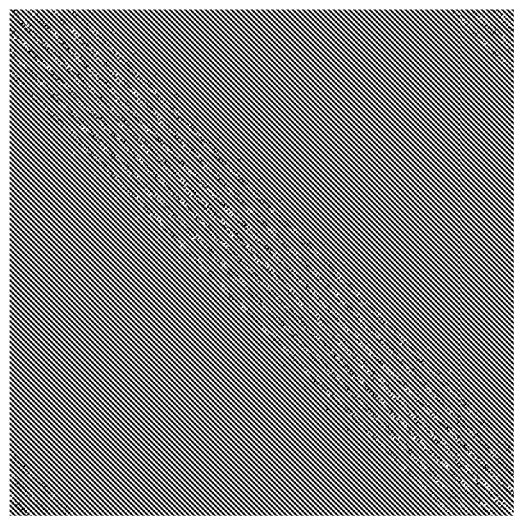
FIG. 6b Nyquist sampling grid 90
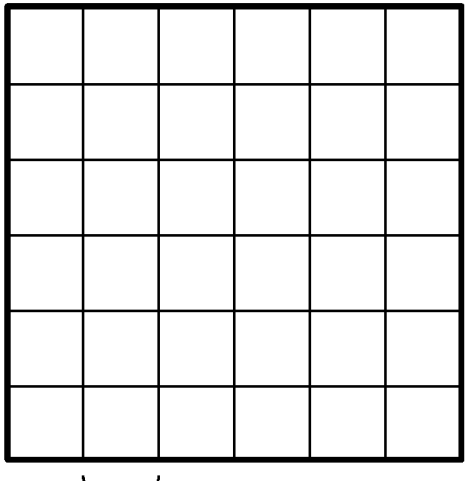
$\Delta x = \frac{\lambda}{4NA}$
Figure 9a
Raw pixel sampling grid 92
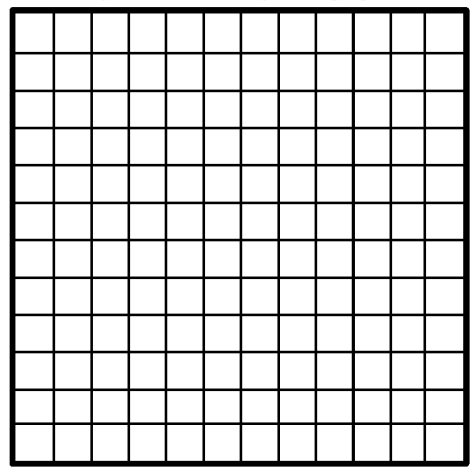
Pitch $\leq \Delta x = \frac{\lambda}{4NA}$
Figure 9b
FIG. 10a
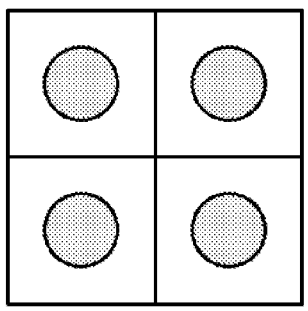
FIG. 10b
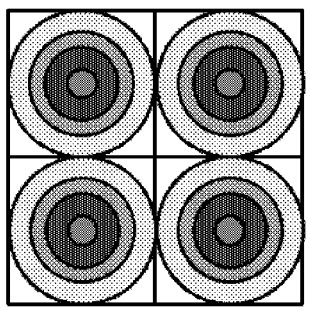
FIG. 10c
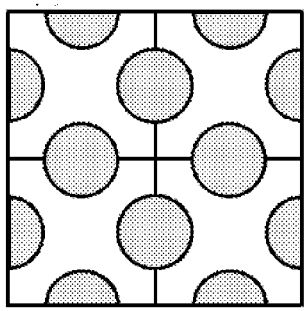
FIG. 10d
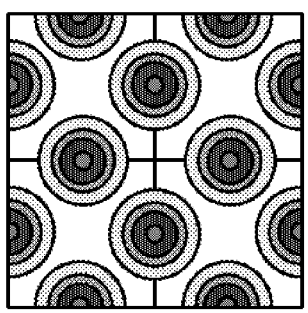

Raw pixel sampling grid color filter array

| 1 | 2 | 1 | 2 | 1 | 2 | 1 | 2 | 1 | 2 | 1 | 2 |
|---|---|---|---|---|---|---|---|---|---|---|---|
| 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 |
| 1 | 2 | 1 | 2 | 1 | 2 | 1 | 2 | 1 | 2 | 1 | 2 |
| 3 | 4 | 3 | 4 | 3 | 4 | 3 | 4 | 3 | 4 | 3 | 4 |

SYSTEM AND METHOD FOR DIGITAL OPTICAL ABERRATION CORRECTION AND SPECTRAL IMAGING

CROSS REFERENCE TO RELATED APPLICATIONS

This application a US national stage application of PCT International Application No. PCT/IL2021/050545 dated May 12, 2021, which claims priority from U.S. provisional patent application No. 63/023,287 filed May 12, 2020, and from Israel patent application 276922, filed Aug. 25, 2020, each of which is incorporated herein by reference.

FIELD OF THE INVENTION

The invention is in the field of optical imaging, digital deblurring, digital aberration correction, digital adaptive optics, and spectral imaging.

BACKGROUND OF THE INVENTION

Optical aberrations are a measure of non-perfect imaging which lead to degraded image quality and sharpness. In geometric optics, perfect imaging is usually described as the condition where rays from each point of light in the object space travel through the imaging system to converge at single corresponding points on the image plane. In actual practice, one must take light's wave-like nature into account, which precludes focusing light to an infinitesimally small point. Rather, for physical wave optics, perfectly converging rays of light yield a finite-sized spot due to diffraction effects. The typical representative diameter of such as spot is given by the Airy disc $1.22 \cdot \lambda/NA$, where $\lambda$ is the typical wavelength, and NA is the numerical aperture of the converging cone of rays. Perfect imaging is usually termed as "diffraction-limited", and in terms of ray-optics, a sufficient criterion is that the rays converge to within the Airy disc.

Optical aberrations can result from a wide range of sources. Some are inherent to the optical imaging system by design compromises due to the conflicting demands between imaging requirements and system complexity. On the one hand, operating requirement parameters such as field-of-view, working distance, magnification, aperture size, and spectral range add additional constraints to the optical design. These are usually manifest as increased system complexity such as an increase in the number and types of optical elements, the materials used, surface profiles (spherical/non-spherical), and alignment and manufacturing tolerances. On the other hand, forces driving towards simplification, such as cost, size, weight, readily available materials and processes, loosened manufacturing tolerances, and robustness to environmental factors lead to compromised image quality. The use of multiple complex aspheric surfaces to reduce aberrations is known in the art.

Additional aberrations are also a result of manufacturing and alignment tolerances during construction of the optical imaging system. Manufacturing and alignment tolerances lead to the actual imaging system's parameters being off the nominal design values. Other aberrations may result from drifts/changes in the optical system due to environmental factors such as thermal changes, pressure changes, shock and/or vibration.

Optical aberrations can also arise due to influences that are outside the imaging system. Imaging through turbulent media such as atmospheric disturbances can lead to time-varying optical aberrations that degrade imaging quality, e.g. "seeing" effects in terrestrial astronomy and surveillance. In medical ophthalmologic imaging, the aberrations present in the subject's eye degrade imaging resolution, in many cases inhibit diffraction-limited resolution in the imaging of microscopic cellular structures on the retina. Imaging of bulk biological tissue is also limited by aberrations induced by the translucent tissue.

In the current state of the art, adaptive optics systems are used to compensate for aberrations. Adaptive optics systems are used especially to compensate for aberrations that depend on the imaging medium outside the imaging system. Adaptive optics systems are further used to compensate for time-dependent variations in the optical system parameters. These adaptive optics systems consist of optical elements that are capable of dynamically modulating the optical wavefront, such as a deformable mirror or spatial light modulator; a feedback wavefront sensor, such as a Shack-Hartmann sensor; and a control unit that uses data from the wavefront sensor to control the wavefront modulation element using closed-loop feedback.

Adaptive optics systems are very complex to integrate into existing imaging systems. The integration of adaptive optics systems into existing imaging systems requires modification of the optical path to incorporate the wavefront sensor and the wavefront modulation element, usually in the form of additional optical relays and beam-splitters. In addition, many adaptive optics systems are designed so that both the wavefront sensor and the wavefront modulation element lie at or near the imaging system's pupil plane, thereby both sampling and correcting the optical wavefront aberration in a uniform manner across the entire imaging field. Spatially dependent adaptive optics correction is usually performed in scanning optical imaging systems, further complicating overall system design. In many cases an additional "guide-star" illumination system is required to provide a sufficient feedback signal for the wavefront sensor, further complicating the system and limiting its usefulness and operational envelope.

On the one hand, the conflicting demands between simple optical designs and high-quality imaging require an effective aberration correction scheme. On the other hand, physically correcting the optical wavefront using adaptive optics is very complex, with limited use-cases and prohibitive costs. Therefore, the idea of digital aberration correction (or digital adaptive optics) is very compelling, i.e. performing a digital algorithmic deblurring of captured imaging data.

In terms of image processing, aberrations are manifest as a blurring kernel that is applied to a nominally ideal image, yielding the blurred image. In many cases, this blurring kernel is spatially-dependent, i.e. a different blur kernel is applied to different portions of the image. In many cases, the actual blur kernel is unknown, especially in the cases where optical aberrations are caused by factors outside the optical imaging system, such as a turbid imaging medium, or when the optical imaging changes due to environmental factors such as ambient temperature, pressure, etc.

Naïve deconvolution deblurring of blurred images has limited results for several reasons. First, in many cases, the actual optical aberrations severely degrade the modulation transfer function (MTF) to such a degree that digitally restoring it introduces unacceptable noise levels. Furthermore, in many cases the blurring kernel is unknown, leading to a host of blind deconvolution/deblurring algorithms with limited success.

Another known technique for digital deblurring and aberration correction is light-field imaging based on using plenoptic cameras, angle-sensitive pixels, and variations thereof, for capturing light-field data. The light-field data is a geometrical description of the light-ray trajectories propagating from the scene to the imaging device. Whereas traditional imaging records the number of light-rays impinging on each sensor pixels regardless of each ray's angle of incidence, light-field imaging purports to record each light-ray's position (i.e. the pixel which it hit) and its angle of incidence using micro-lens arrays in a plenoptic camera configuration or angle-sensitive pixels. In concept, light-field imaging provides data on the imaged scene's light-rays' position and angle as they propagate from the imaged object through the main imaging aperture and onto the image sensor. In theory, this record of ray angle-position data can then be used to virtually ray-trace, propagate and manipulate the light-rays to infer the distance between object and camera as well as to digitally correct aberrant rays that did not converge to a perfect focus, either due to aberrations or by merely being far from the in-focus plane.

It is known that light-field imaging cannot allow for digital deblurring and restoration of image quality up to diffraction-limited perfect imaging. Due to its inherent angle-spatial resolution trade-off, light-field imaging is capable of yielding image resolutions that are a multiple factor (typically 3-10) of the diffraction-limited Nyquist sampling limit given by $\Delta x=\lambda/4NA$. The reason for this is that the plenoptic system's entrance pupil, as imaged through the main imaging lens is only a fractional segment of the main lens's entrance pupil, yielding much lower optical resolution. The logic behind this configuration is that each such fractional pupil segment represents a different ray angle bundle. Without the segmentation of the main imaging pupil, the plenoptic system cannot discern the angular information of the rays imaged through the system, rendering the entire virtual ray-tracing and propagation scheme void.

Thus, the promise that light-field imaging can be used to correct optical aberrations remains unfulfilled since classical light-field imaging works far from the optical diffraction limit of the main imaging aperture. Light-field's inherent image resolution and quality are much lower than the effective degraded resolution induced by typical aberrations to diffraction-limited optics, so they leave nothing to gain.

Further known techniques are based on sparse sampling and underdetermined reconstruction, such as coded aperture and compressed light-field techniques. However, these methods are based on heuristic assumptions on the imaged scene, and therefore create numerous imaging artifacts for scenes that contain elements not covered by the algorithm's training set. In addition, the required aperture coding and the compressed-light-field masks block significant portions of light, reduce the signal reaching the detector sensor array and reduce the system's overall signal-to-noise ratio (SNR). These types of imaging systems are designed to work far from the main imaging aperture's diffraction limit, similar to light-field imaging.

Correcting aberrations with hardware-based adaptive optics systems is very complex and costly, may have limited effectivity, and can impose limiting constraints on the imaging system's operational envelope. Digital aberration correction based on deblurring and deconvolution techniques of blurred raw images is typically limited by noise and the inability to know the aberration blurring kernel in advance. Moreover, light-field based methods cannot perform diffraction-limited digital aberration correction due to the inherent spatial and angular resolution limitations. Sparse sampling techniques are known to introduce unacceptable imaging artifacts, reduce system SNR, and typically also work far from the diffraction-limit.

Conventional color imaging typically uses a color filter array, such as the RGB Bayer filter arrangement and variations thereof. This induces a significant loss of light transmission that reaches the sensor. Typically, up to 50-70% of the light is filtered out. The use of dichroic prisms can overcome the loss of light, but at the expense of added image sensors and system complexity. Other multi-spectral or hyperspectral imagers that rely on diffraction gratings can typically only function as one-dimensional line-scan cameras, with a narrow entrance slit.

There is a need for a system and method for performing digital aberration correction up to the diffraction-limit and optionally with no loss of light, yielding deblurred output images at maximal SNR, regardless of the imaged input scene. There is a need to perform RGB color, multi-spectral imaging or hyper-spectral imaging with a 2D imaging array and minimal loss of light, possibly also in conjunction with digital aberration correction.

SUMMARY OF THE INVENTION

According to embodiments on the invention, there is provided an optical system comprising: an optical imaging unit, to form an optical image near an image plane of the optical system; a wavefront imaging sensor unit located near the image plane, to provide raw digital data on an optical field and image output near the image plane; and a control unit for processing the raw digital data and the image output to provide deblurred image output; wherein the control unit comprises a storage unit that stores instructions and a processing unit to execute the instructions to receive the image input and the raw digital data of the optical field impinging on the wavefront imaging sensor and generate a deblurred image based on an analysis of the optical mutual coherence function at the imaging plane.

The control unit may further to: calculating a field property of the optical field; discerning between point-sources in the image output based on coherence and superposition information in the field property; for each discerned point-source, estimating its degree of blurring; and reconstructing a deblurred image as a composition of the deblurred point-sources.

The field property may be a Wigner distribution or an equivalent entity related to the Wigner distribution by a mathematical transformation.

The wavefront imaging sensor unit may further comprise a color filter array with at least two color bands, and the control unit is to calculating a field property corresponding to each of the color bands, giving rise to a plurality of chromatic field properties, and to reconstructing the deblurred image based on a combination of the chromatic field properties.

The wavefront imaging sensor unit may comprise at least two image sensors, each associated with a spectral filter and the control unit is to calculating a field property corresponding to each of the at least two image sensors, giving rise to a plurality of chromatic field properties, and to reconstructing the deblurred image based on a combination of the chromatic field properties.

According embodiments of the invention, the wavefront imaging sensor unit comprises: an optical modulator unit located near the image plane; and an image sensor unit located downstream the optical modulator unit with respect to a general direction of propagation of input optical field through the system, for acquiring raw digital image output, wherein the optical modulator unit is to modulates the optical field using at least one of a phase modulation and an amplitude modulation.

The optical modulator unit may comprise a plurality of unit cells, and the image sensor unit may comprise an array of sensor cells; the array of sensor cells defines a plurality of sensor sub-array unit cells, each sensor sub-array corresponding to a unit cell of said plurality of the unit cells of the optical modulator unit; and the optical modulator unit is to apply pre-determined modulation to input light collected by the image sensor unit, and each unit cell of the optical modulator unit directs a portion of the collected input light incident thereon onto sensor sub-array unit cell corresponding therewith and one or more neighboring sensor sub-array unit cells within a pre-determined proximity region.

According to embodiments of the invention, a raw pixel count $N_R$ of the plurality of sensor sub-array unit cells of image sensor unit is equal to or larger than a number of Nyquist sampling points $N_N$ of the optical modulator unit.

According to other embodiments, the raw pixel count $N_R$ of the plurality of sensor sub-array unit cells of image sensor unit and the number of Nyquist sampling points $N_N$ of the optical modulator unit follow the relation $N_R \geq N_N + \Sigma_i N_A^i$, where $1 \leq N_A^i \leq N_N$, and wherein $N_A^i$ is indicative of a dynamic aberration's spatial variability.

According to embodiments of the invention, the control unit is to calculating a field property corresponding to each of the unit cells, giving rise to a plurality of chromatic field properties, and to reconstructing, based on a combination of the chromatic field properties, at least one of a group consisting of: full color RGB image, hyper-spectral image without the use of spectral filters or color filters.

According to other embodiments, the control unit is to calculating a chromatic field property corresponding to each of the unit cells, giving rise to a plurality of chromatic field properties, and to reconstructing an output image having a number $N_O$ of output image pixels and a number $N_C$ of chromatic field properties, wherein $N_O$ is lower that the Nyquist sampling limit $N_N$ and $N_C \times N_O \leq N_R$, the number of raw pixels.

According to an aspect of the invention, in case the optical field comprises multiple wavelengths, being distinct or continuous, the control unit is to perform one or both of: (1) estimating, for each discerned point-source, its spectral distribution; (2) reconstructing a spectral distribution map of the image.

The control unit is further to perform one or more of: (1) estimating aberration strength for each discerned point-source; (2) estimating depth based on dynamic aberration strength estimated for each discerned point-source, giving rise to a spatial map of power aberration strength, and reconstructing a depth map based on a spatial map of power aberration strength; and (3) based on the depth map, restoring diffraction-limited imaging resolution for defocus portions of the image.

At least the unit cells of the optical modulator unit and the array of sensor cells of the image sensor unit may be manufactured as one of a group consisting of: monolithically integrated units; such that the unit cells are part of the process stack used to manufacture the array of sensor cells; and separate units.

The design of the optical modulation unit may be one of a group consisting of: a binary design with one disk unit per unit cell; a multi-level design consisting of concentric rings with equally spaced radii; a multi-level design consisting of concentric rings with at least two non-equally spaced radii; a binary design with two disks per unit cell, arranged on edges of the unit cells; a multi ring design with two sets of rings per unit cell, arranged on edges of the unit cells.

The unit cells of the optical modulation unit are to apply a phase modulation, an amplitude modulation or both phase and amplitude modulation.

The optical imaging unit may be one of a group consisting of a refractive optical imaging unit, reflective optical imaging unit, catadioptric optical imaging unit, diffractive optical imaging unit, and a combination thereof.

The optical imaging unit may comprise an objective lens and at least one of a group consisting of a tube lens, a relay optics and a telescope optics for the formation of an image at the image plane. The optical imaging unit may be used as a camera lens and be one of a group consisting of a wide-angle lens, a normal lens, a telephoto lens and a zoom lens. The optical imaging unit may be one of a group consisting of a refractive telescope system, reflective telescope system or catadioptric telescope system.

The wavefront imaging sensor unit may be one of a group consisting of: a 2D area sensor, a line-scan sensor, a multi-line scan sensor, and a TDI sensor.

According to an aspect of the invention, there is provided a method for digital optical aberration correction of an image formed by an imaging unit near an imaging plane of an optical system, comprising: providing raw digital data on an optical field impinging on a wavefront imaging sensor unit located near the image plane and image output formed near the image plane; and processing, by a control unit, the raw digital data and the image output to provide deblurred image output based on an analysis of optical mutual coherence function at the image plane.

In one embodiment, the wavefront imaging sensor unit comprises an optical modulator unit located near the image plane and an image sensor unit located downstream the optical modulator unit with respect to a general direction of propagation of input optical field through the system, for acquiring raw digital image output, and the method further comprises modulating the optical field using at least one of phase modulation and amplitude modulation.

In another embodiment, the optical modulator unit comprises a plurality of unit cells, and the image sensor unit comprises an array of sensor cells; the array of sensor cells defines a plurality of sensor sub-array unit cells, each sensor sub-array corresponding to a unit cell of said plurality of the unit cells of the optical modulator unit; and wherein the method further comprises: applying, by the optical modulator unit, pre-determined modulation to input light collected by the image sensor unit; directing, by each unit cell of the optical modulator unit a portion of the collected input light incident thereon onto sensor sub-array unit cell corresponding therewith and one or more neighboring sensor sub-array unit cells within a pre-determined proximity region. The raw pixel count $N_R$ of the plurality of sensor sub-array unit cells of image sensor unit may be equal to or larger than the number of Nyquist sampling points $N_N$ of the optical modulator unit. The raw pixel count $N_R$ of the plurality of sensor sub-array unit cells of image sensor unit and the number of Nyquist sampling points $N_N$ of the optical modulator unit may follow the relation $N_R \geq N_N + \Sigma_i N_A^i$, where $1 \leq N_A^i \leq N_N$, and wherein $N_A^i$ is indicative of a dynamic aberration's spatial variability.

In an embodiment of the invention, the method further comprises calculating a field property of the optical field; discerning between point-sources in the image output based on coherence and superposition information in the field property; for each discerned point-source, estimating its blurring; reconstructing a deblurred image as a composition of the deblurred point-sources. The field property may be a Wigner distribution or an equivalent entity related to the Wigner distribution by a mathematical transformation.

In an embodiment of the invention, the wavefront imaging sensor unit further comprises a color filter array with at least two color bands, and the method further comprises calculating a chromatic field property corresponding to each of the color bands, giving rise to a plurality of chromatic field properties, and reconstructing the deblurred image based on a combination of the chromatic field properties.

In another embodiment, the wavefront imaging sensor unit comprises at least two image sensors, each associated with a spectral filter and the method further comprises calculating a chromatic field property corresponding to each of the at least two image sensors, giving rise to a plurality of chromatic field properties, and reconstructing the deblurred image based on a combination of the chromatic field properties.

In yet another embodiment, the raw pixel count $N_R$ of the plurality of sensor sub-array unit cells of the image sensor unit is equal to or higher than the number of Nyquist sampling points $N_N$ of the optical modulator unit, and the method further comprises calculating a chromatic field property corresponding to each of the unit cells, giving rise to a plurality of chromatic field properties, and reconstructing, based on a combination of the chromatic field properties, at least one of a group consisting of: full color RGB image, hyper-spectral image without the use of spectral filters or color filters.

In case the optical field comprises multiple wavelengths, being distinct or continuous, the method further may comprise estimating, for each discerned point-source, its spectral distribution. The method may further comprise reconstructing a spectral distribution map of the image.

According to yet another aspect of the invention, there is provided a method of processing raw digital data indicative of elements of an optical mutual coherence function of an optical field near an image plane of an optical system, the method comprising: calculating a field property based on the optical mutual coherence function; discerning between point-sources in an image outputted near the image plane based on coherence and superposition information in the field property; for each discerned point-source, estimating its blurring, giving rise to deblurred point-sources; and reconstructing a deblurred image as a composition of the deblurred point-sources.

The method may further comprise any of the following operations or a combination thereof: estimating a degree of aberration strength for each point source; estimating spatial spectral distribution for each point source, giving rise to a set of point-by-point spectral distribution estimates; reconstructing a spatial map of a spectral distribution of the optical field based on the set of point-by-point spectral distribution estimates; transforming the optical mutual coherence function to a Wigner distribution using a Wigner-Weyl transform and performing said discerning, estimating and calculating based on the Wigner distribution. The operation of estimating a degree of aberration strength for each point source may further comprise classifying aberrations as a static aberration or as a dynamic aberration.

According to an aspect of the invention, there is provided a method for image processing, comprising: generating raw digital data indicative of elements of an optical mutual coherence function of an optical field near an image plane of an optical system, the generating comprises: modulating the optical field with an optical modulator unit having a plurality of unit cells, acquiring raw digital image output by an image sensor unit located downstream the optical modulator unit with respect to a general direction of propagation of an input optical field through the system, the image sensor unit comprises an array of sensor cells, the array of sensor cells defines a plurality of sensor sub-array unit cells, each sensor sub-array corresponding to a unit cell of said plurality of the unit cells of the optical modulator unit such that each unit cell of the optical modulator unit directs a portion of the collected input light incident thereon onto sensor sub-array unit cell corresponding therewith and one or more neighboring sensor sub-array unit cells within a pre-determined proximity region; processing said raw data according to methods according to embodiments of the invention.

According to another aspect of the invention, there is provided a method of processing raw digital data indicative of elements of an optical mutual coherence function of an optical field near an image plane of an optical system, the method comprising: calculating a field property based on the optical mutual coherence function; discerning between point-sources in an image outputted near the image plane based on coherence and superposition information in the field property; estimating spatial spectral distribution for each discerned point source, giving rise to a set of point-by-point spectral distribution estimates.

The method may further comprise any of the following operations or a combination thereof: reconstructing a spatial map of a spectral distribution of the optical field based on the set of point-by-point spectral distribution estimates; for each discerned point-source, estimating its blurring, giving rise to deblurred point-sources and reconstructing a deblurred image as a composition of the deblurred point-sources; estimating a degree of aberration strength for each point source; transforming the optical mutual coherence function to a Wigner distribution using a Wigner-Weyl transform and performing said discerning, estimating and calculating based on the Wigner distribution. The operation of estimating a degree of aberration strength for each point source comprises may further comprise classifying aberrations as a static aberration or as a dynamic aberration.

According to an aspect of the invention, there is provided a wavefront imaging sensor system, comprising an optical modulator unit and an image sensor unit located downstream the optical modulator unit with respect to a general direction of propagation of an input optical field through the system, for acquiring raw digital image output, wherein: the optical modulator unit comprises a plurality of unit cells, and the image sensor unit comprises an array of sensor cells, the array of sensor cells defines a plurality of sensor sub-array unit cells, each sensor sub-array corresponding to a unit cell of said plurality of the unit cells of the optical modulator unit; a raw pixel count $N_R$ of the plurality of sensor sub-array unit cells of image sensor unit is equal to or larger than a number of Nyquist sampling points $N_N$ of the optical modulator unit; the optical modulator unit is to apply pre-determined modulation to input light collected by the image sensor unit, and each unit cell of the optical modulator unit directs a portion of the collected input light incident thereon onto sensor sub-array unit cell corresponding therewith and one or more neighboring sensor sub-array unit cells within a pre-determined proximity region; and a design of the unit cells follows at least one condition from a group consisting of: the raw pixel count $N_R$ of the plurality of sensor sub-array unit cells of the image sensor unit is equal to or higher than of the number of Nyquist sampling points $N_N$ of the optical modulator unit; a binary design with one disk unit per unit cell; a multi-level design consisting of concentric rings with equally spaced radii; a multi-level design consisting of concentric rings with at least two non-equally spaced radii; a binary design with two disks per unit cell, arranged on edges of the unit cells; a multi ring design with two sets of rings per unit cell, arranged on edges of the unit cells and a quasi-periodic design.

According to another aspect of the invention, there is provided a method of designing a wavefront imaging sensor system having an optical modulator unit and an image sensor unit located downstream the optical modulator unit with respect to a general direction of propagation of an input optical field through the system, for acquiring raw digital image output, the method comprises: providing, at the optical modulator unit—a plurality of unit cells, and at the image sensor unit—an array of sensor cells, the array of sensor cells defines a plurality of sensor sub-array unit cells, each sensor sub-array corresponding to a unit cell of said plurality of the unit cells of the optical modulator unit, such that a raw pixel count $N_R$ of the plurality of sensor sub-array unit cells of image sensor unit is equal to or larger than a number of Nyquist sampling points $N_N$ of the optical modulator unit and such that the optical modulator unit is to apply pre-determined modulation to input light collected by the image sensor unit, and each unit cell of the optical modulator unit is to direct a portion of the collected input light incident thereon onto sensor sub-array unit cell corresponding therewith and one or more neighboring sensor sub-array unit cells within a pre-determined proximity region; and designing the unit cells to follow at least one condition from a group consisting of: the raw pixel count $N_R$ of the plurality of sensor sub-array unit cells of the image sensor unit is equal to or higher than the number of Nyquist sampling points $N_N$ of the optical modulator unit; a binary design with one disk unit per unit cell; a multi-level design consisting of concentric rings with equally spaced radii; a multi-level design consisting of concentric rings with at least two non-equally spaced radii; a binary design with two disks per unit cell, arranged on edges of the unit cells; a multi ring design with two sets of rings per unit cell, arranged on edges of the unit cells; and a quasi-periodic design.

According to an aspect of the invention, there is provided an optical system comprising: an optical imaging unit, to form an optical image near an image plane of the optical system; adaptive optics system unit, located between the optical imaging unit and the image plane; a wavefront imaging sensor unit located near the image plane, to provide raw digital data on an optical field and image output near the image plane; and a control unit for processing the raw digital data and the image output to provide deblurred image output; wherein the control unit comprises a storage unit that stores instructions and a processing unit to execute the instructions to receive the image input and the raw digital data of the optical field impinging on the wavefront imaging sensor and generate a deblurred image based on an analysis of optical mutual coherence function at the imaging plane, and wherein the adaptive optics system unit comprises an adaptive optics wavefront sensor and an adaptive optics wavefront modulator situated near the imaging system's pupil plane and an adaptive optics control unit; wherein the adaptive optics wavefront sensor provides feedback to drive the wavefront modulator under the control of the adaptive optics control unit. The adaptive optics system unit may further comprise a pupil relay and a tube lens. The control unit is to receive information from the adaptive optics wavefront sensor and to provide a coarse measure of wavefront aberrations. The optical imaging unit, the wavefront sensor and the control unit—as well as the adaptive optics wavefront sensor, the adaptive optics wavefront modulator and the adaptive optics control unit—may be realized in accordance with any aspects and embodiments of the invention.

BRIEF DESCRIPTION OF THE DRAWINGS

For a better understanding of the invention regarding the embodiments thereof, reference is made to the accompanying drawings, in which like numerals designate corresponding entities throughout, and in which:

FIGS. 3a-3b are flow charts illustrating methods according to embodiments of the invention;

FIG. 4 is a source reference object—Siemens star target;

FIGS. 5a-5b illustrate example properties of a system according to an embodiment of the invention;

FIGS. 6a and 6b illustrate an optical property of a system according to an embodiment of the invention;

FIGS. 9a-9b schematically illustrates raw pixel arrangements according to embodiments of the invention;

FIGS. 10a-10d schematically illustrates aspects of an optical modulator unit according to embodiments of the invention;

DETAILED DESCRIPTION OF EMBODIMENTS

According to embodiments of the invention, systems and methods for digital optical aberration correction are described. The proposed systems may correct optical aberrations up to the diffraction-limit without introducing imaging artifacts. In some implementations, the proposed systems may correct optical aberrations without reducing light transmittance through the optical system. The ability to correct optical aberrations in imaging systems can lead to simplified optics, enhanced operating parameters, and a wider range of applications.

Figure 1A:
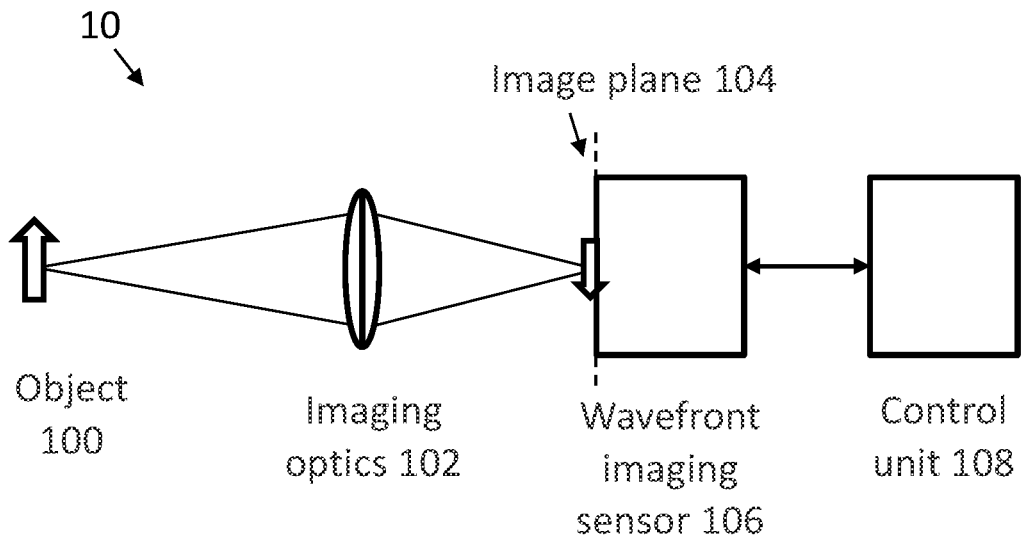
FIG. 1a is a block diagram that schematically illustrates a digital optical aberration correction system in accordance with an embodiment of the invention.

According to an embodiment of the invention illustrated in FIG. 1a, the digital optical aberration correction system 10 consists of an optical imaging unit 102, also referred to as 'imaging optics'. The optical imaging unit 102 is used to form an optical image near an image plane 104 or surface; a wavefront imaging sensor unit 106; and a control unit 108. The control unit 108 is for processing raw digital image output of object 100 to provide deblurred image output. The control unit 108 may also measure optical aberration strengths on the image plane 104.

Embodiments of the invention may be construed to address several applications: a microscope, a camera, telescopes, long-range imaging systems, and more. For example, in a microscope application, the optical imaging unit 102 may consist of an objective lens, optionally a tube lens and other relay or telescope optics (not shown in FIG. 1) for the formation of an image at the system's image plane 104. For a camera application, the optical imaging unit 102 may be used as the camera lens, which can be a wide-angle lens, a normal lens, a telephoto lens, or a zoom lens (not shown in FIG. 1a). For telescopes and long-range imaging systems, the optical imaging unit 102 may consist of a refractive, reflective or catadioptric telescope system (not shown in FIG. 1a).

Figure 1B:
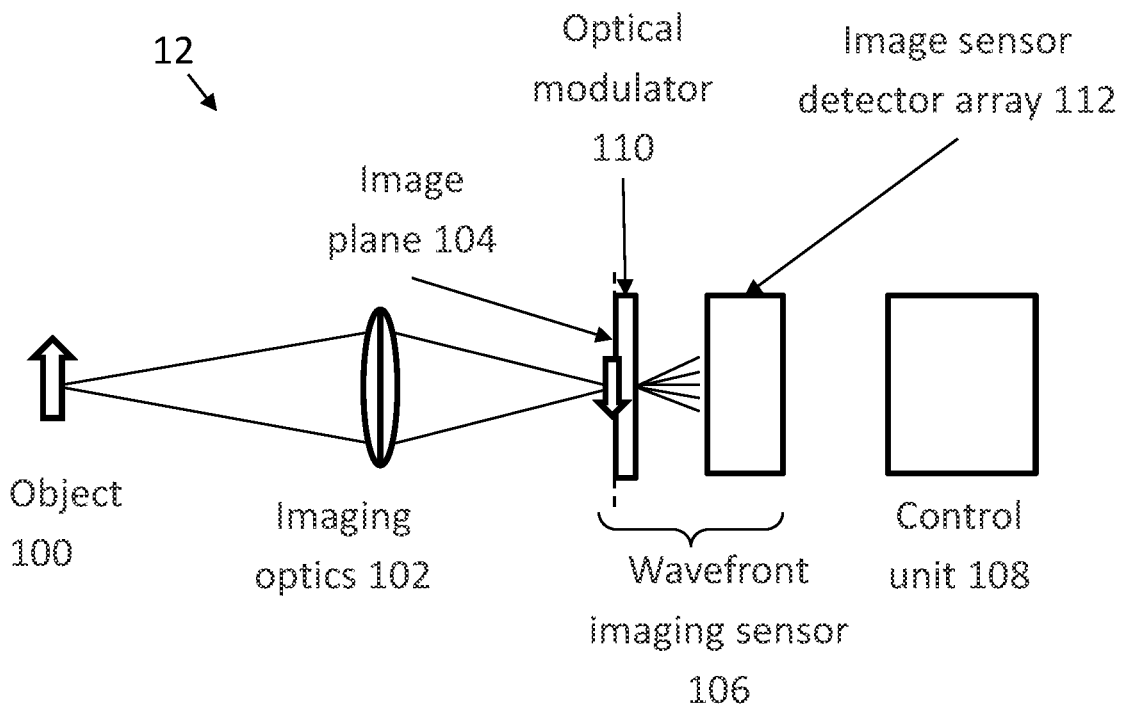
FIG. 1b is a block diagram that schematically illustrates a digital optical aberration correction system in accordance with another embodiment of the invention.

An optical system 12 according to an embodiment of the invention, is illustrated in FIG. 1b: the wavefront imaging sensor unit 106 may consist of an optical modulator unit 110 near the image plane 104. The optical modulator unit 110 modulates the light using phase modulation, amplitude modulation, or both. The wavefront imaging sensor unit 106 may further consist of an image sensor detector array 112, also referred to as a downstream image sensor unit 112. The image sensor detector array 112 is for acquiring raw digital image output.

The wavefront imaging sensor unit 106 can be configured as any of the conventional types of imaging sensors, such as a 2D area sensor, a line-scan sensor, a multi-line scan sensor, or TDI sensor, depending on the application.

The control unit 108 (shown in FIGS. 1a and 1b) may consist of a processing unit and a storage unit (not shown). The processing unit may be used to perform digital algorithm processing, as described below. The storage unit can store precalculated or pre-measured or otherwise pre-determined data indicative of the optical image unit's static aberrations as described below.

The storage unit can also be used to store precalculated, pre-measured or otherwise pre-determined data indicative of the optical image unit's chromatic properties. The storage unit may store precalculated, pre-measured or otherwise pre-determined data indicative of chromatic properties of the wavefront imaging sensor unit 106, and optionally also the optical modulator unit 110.

The optical imaging unit 102 can be of any type—refractive, reflective, catadioptric, diffractive, or combinations thereof. The optical imaging unit 102 may be designed and constructed with relaxed optical aberration specifications to simplify its design and manufacturing process whilst relying on the digital aberration correction capabilities of the system described herein to restore image quality and sharpness. Aberration types induced by the optical imaging unit 102 which may be corrected by system 10 are, but not limited to: the Seidel aberrations—spherical, coma, astigmatism, field curvature, and distortion; lateral and longitudinal chromatic aberrations; and optionally also their higher order counterparts.

The wavefront imaging sensor unit 106 is responsible for providing raw-data to the control unit 108 to enable diffraction-limited deblurring reconstruction. The wavefront imaging sensor unit 106 may also provide measures of optical aberration strengths at the image plane 104. The term 'raw data' refers to the digitization of the optical intensity as measured by the image sensor 106. The raw data is further processed by the control unit 108 for example, as described below to provide measures of elements of the optical mutual coherence function or equivalent entities such as the Wigner distribution. The wavefront imaging sensor 106 is designed to provide data on elements of the optical mutual coherence function of the optical field near the imaging system's image plane 104 at a diffraction-limited sampling resolution. A standard Shack-Hartmann type sensor, a plenoptic camera sensor, or an angle-sensitive pixel sensor are not capable of providing this data at diffraction-limited sampling resolution as explained in the background section.

The term "wavefront imaging sensor" as used herein relates to the capability to provide diffraction-limited sampling resolution. The term "wavefront sensor" as used herein, refers to conventional techniques, such as the Shack-Hartmann sensor, plenoptic camera or angle-sensitive pixels, that are incapable of reaching diffraction-limited sampling resolution.

According to an embodiment of the invention, the wavefront imaging sensor unit 106 and control unit 108 may operate along the principles described in PCT Patent Publication WO/2018/185740, which is incorporated herein by reference. According to embodiments of the invention, the wavefront imaging sensor 106 consists of an optical modulator 110 (also referred to as an encoder) located near the imaging optics' image plane 104 and a downstream image sensor detector array 112. The optical modulator 110 (the encoder) may be a static, passive optical element that performs either amplitude modulation, or phase modulation, or both, on the light reaching the image plane 104. If only phase modulation is performed, then the optical modulator 110 does not induce any additional losses in the optical system 10. From there, the modulated light propagates to the downstream detector array 112, sampled and then digitized. The raw digital data—the output of the sub-pixel sensor cells array 112—is then processed by the control unit 106. The encoder unit 110 cells' relation to Nyquist sampling of the optical field at the image plane 104 will be described below. The control unit 106 can be used to perform the functions of the control unit described in WO/2018/185740, as well as additional control functionality for example, as described below. The control functionalities can be performed by separate control units.

It should be noted that in some embodiments of the invention, the optical modulator 110 may be a separate unit from the detector array 112. In other embodiments, the optical modulator 110 may be monolithically integrated with the detector array 112. According to yet other embodiments, the optical modulator 110 may be part of the process stack used to manufacture the sensor array 112, e.g. using metallization process steps, or process steps similar to those used in manufacturing micro-lens arrays used to improve pixel fill-factors in sensor arrays.

The wavefront imaging sensor unit 106 provides measures of the optical mutual coherence function at the imaging system's imaging plane 104. The optical mutual coherence function $\rho$ of an optical field $E(x)$ defines the time averaged spatial correlation of the field, being:

$$\rho(x, x') = \langle E(x) E^*(x') \rangle \quad \text{(Equation 1)}$$

Where, in Equation 1, $x = (x, y)$ relates to the transverse spatial coordinates of the field. Generally, the use of a detector array and digitized data requires certain discretization of the mutual coherence providing a mutual coherence matrix of the form:

$$\rho_{ij} = \langle E(x_i) E^*(x_j) \rangle \quad \text{(Equation 2)}$$

Where, in Equation 2, $E(x_i)$ relates to complex amplitude of the field at point $x_i=(x_{i_x}, y_{i_y})$, and $E^*(x_j)$ relates to the complex conjugate of the field at point $x_j=(x_{j_x}, y_{j_y})$. It should be noted that physically possible realizations of a mutual coherence matrix are Hermitian and non-negative.

As is known in the art, conventional imaging and detection techniques, or a typical detection device or system, provide data indicative of the diagonal elements which correspond to conventional intensity measurements, i.e. $I_i=\rho_{ii}=\langle E(x_i)E^*(x_i)\rangle$. The measured intensity $I_i=\rho_{ii}$ is indicative of the number of photons/rays impinging on each detector pixel regardless of angle of incidence, providing a discretized measure of transverse ray position x. The measured intensity $I_i=\rho_{ii}$ provides no information on the off-diagonal elements. The off-diagonal elements of the mutual coherence function contain phase and coherence relations of the optical field.

The phase and coherence relations in the off-diagonal elements are indicative of the angular information of the light-rays impinging on the wavefront imaging sensor 106 at the optical system's image plane 104. In physical optics, the correlation between wave position and angles is fully described by the Wigner distribution $W(x, \theta)$, where $x=(x, y)$ relates to the transverse spatial coordinates of the field, and $\theta=(\theta_x, \theta_y)$ describes the ray trajectory angles. In the limit of ray optics, the Wigner distribution reduces to the classical light-field description of geometric optics rays where each ray's position x and angle of propagation θ is recorded. However, the Wigner distribution is actually a "quasi-probability" that may attain negative values which are indicative of physical optics wave-like phenomena.

Mathematically, the Wigner distribution and the mutual coherence function are fully equivalent, and they are related by a Fourier transform (the Wigner-Weyl transform):

$$W(x, \theta) = \frac{\lambda}{2} \int \rho(x+x', x-x') e^{-2i \sin(\theta) x'/\lambda} dx' \quad \text{(Equation 3)}$$

As is known in the art, classical light-field plenoptic cameras, angle-sensitive pixel sensors, or Shack-Hartmann type sensors are incapable of providing diffraction-limited imaging resolution or aberration deblurring. According to embodiments of the invention, the wavefront imaging sensor 106 can provide diffraction-limited sampling of the mutual-coherence function. From the Wigner-Weyl transform we obtain a Wigner distribution with diffraction-limited spatial sampling. The angular sampling resolution of the resultant Wigner distribution is related to the maximal off-diagonal distance that is measured in the mutual coherence function.

According to embodiments of the invention, the combined position-angle information contained in the Wigner distribution is then used to perform digital aberration correction. For illustration, the following simple example demonstrates how digital aberration correction is performed. The illustrated simple example can be extended to cover all aberration types over any type of imaged scene.

Figure 2A:
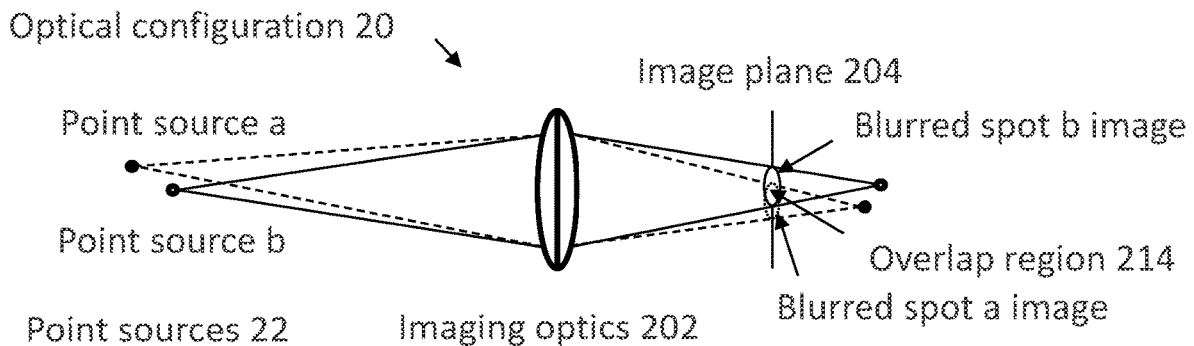
FIGS. 2a-2c are schematic illustrations of optical configurations, exemplifying aspects of embodiments of the invention.
Figure 2B:
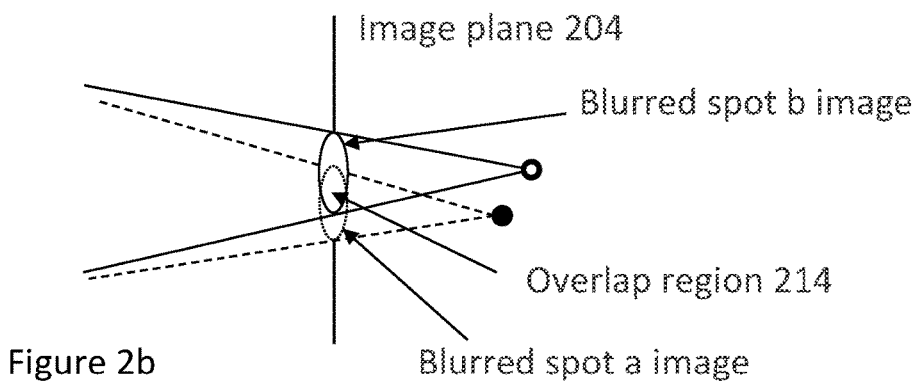

The optical configuration 20 is depicted in FIG. 2a. In this simple example, we consider the imaging of two distinct but close point-sources a and b that are imaged using perfect optics 202. The overlapping blurred spot a image and blurred spot b image are shown in greater detail in FIG. 2b. The two point-sources a and b are placed outside the imaging system's focal plane, i.e. they are out of focus, perhaps even by different degrees of defocus. In this example, the defocusing and subsequent blurring are treated as an example representative of imaging aberrations in general, and can be extended to any type of aberration. The degree of defocus and spatial separation is chosen so that the blurred images of the two point-sources a and b overlap.

Had the point sources been more widely spaced—so that their blurred images would not overlap, then known techniques would be suitable to digitally deconvolve each of their images, and even estimate their degree of aberration using phase retrieval or other techniques. In general, blurred images contain many overlapping, and optionally different, blur kernels, each corresponding to a point source in the imaged object space.

Figure 2C:
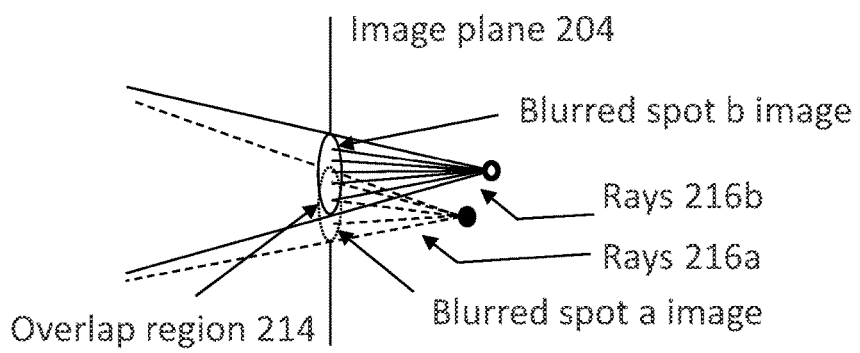

Therefore, we find that the general problem at hand is how to perform digital estimation of the blur kernel for two or more overlapping blur kernels that may have different degrees of aberrations, just as in the simple example under discussion, illustrated in FIG. 2a. We now refer to the ray-tracing geometrical optics description of the problem at hand, illustrated in FIG. 2c. We find that in the overlapping blur region 214 of the two defocused blurred spot a and b images there are points that contain rays 216 that converge towards both the image of the first point-source (point source a) and also towards the image of the second point-source (point source b). In the particular example of FIG. 2c, the convergence points are placed behind the imaging system's image plane 204, hence the defocused point-source images. Without loss of generality, the same considerations are in force if either one or both point-sources are imaged to points before the image plane 204 (not shown). Within the overlapping region 214, each spatial point contains two rays 216 with different angles, one ray 216a from the first point-source (point source a), and the other ray 216b from the second point-source (point source b).

Assuming using a conventional plenoptic light-field sensor or an angle-sensitive pixel imaging sensor placed at the image plane 204: these types of sensors are configured to provide a 1-1 correspondence between output data and the input rays of light impinging on the sensor. Each light-field data point corresponds to a particular position in space x with a unique light-ray with propagation θ. Angle sensitive pixel detectors also provide such 1-1 information. When a particular pixel lights up, it indicates the ray position x and a single angle of incidence θ. On the other hand, as we just demonstrated in our simple example illustrated in FIGS. 2a-2c, within the overlap regions 214 there are positions that contain two distinct rays with different angles passing through them. These types of dual or multiple-ray points cannot be accurately recorded by conventional angle-sensitive or plenoptic light-field sensors since the 1-1 correspondence is broken. We also note that this 1-1 correspondence constraint is also part of the reason that conventional angle-sensitive pixel sensors and plenoptic light-field sensors cannot perform imaging up to the diffraction limit. When operating at a resolution coarser than the diffraction-limit spatial resolution, the ray-tracing light-field description of the optical field does not contain such ambiguous regions where the 1-1 correspondence between ray position and angle is broken.

On the other hand, the Wigner distribution $W(x, \theta)$ can safely describe and quantify the ambiguity where the 1-1 angle-position correspondence is broken. Recall that the Wigner distribution was extracted from the mutual coherence function $\rho(x, x')=\langle (x)E^*(x')\rangle$ using the Wigner-Weyl transform, which in turn was estimated by the wavefront sensor unit. The Wigner distribution is not only the wave-optics analog of the classical light-field geometrical ray-optics description. It also contains coherence and interference information. The Wigner distribution accurately records and describes overlapping combinations of rays like rays 216 described in the overlapping region 214 in the above example illustrated in FIGS. 2a-2c.

Using the Wigner distribution description, it is possible to both measure and discern between the overlapping but distinct rays in the overlapping blur region 214. By doing so, we can reduce the problem to a simpler one of non-overlapping blurred point-sources. We can perform deblurring, and also estimate the degree of aberrations and defocus that caused the blurring.

The Wigner distribution contains data indicative of the optical field's spectral content. This is in addition to the data indicative of the optical field's intensity, coherence and phase. The spectral content can be accessed through the wavelength dependence described in Equation 3.

The wavefront imaging sensor may also be used to extract spectral information on the imaged input scene. The spectral information contained by the Wigner distribution may be used to estimate each point source's spectral distribution ("spectrum"). The spectral information may optionally be used to reconstruct spectral distribution maps of the imaged scene, either as a color (RGB), multi spectral image or hyper-spectral image.

Figure 3A:
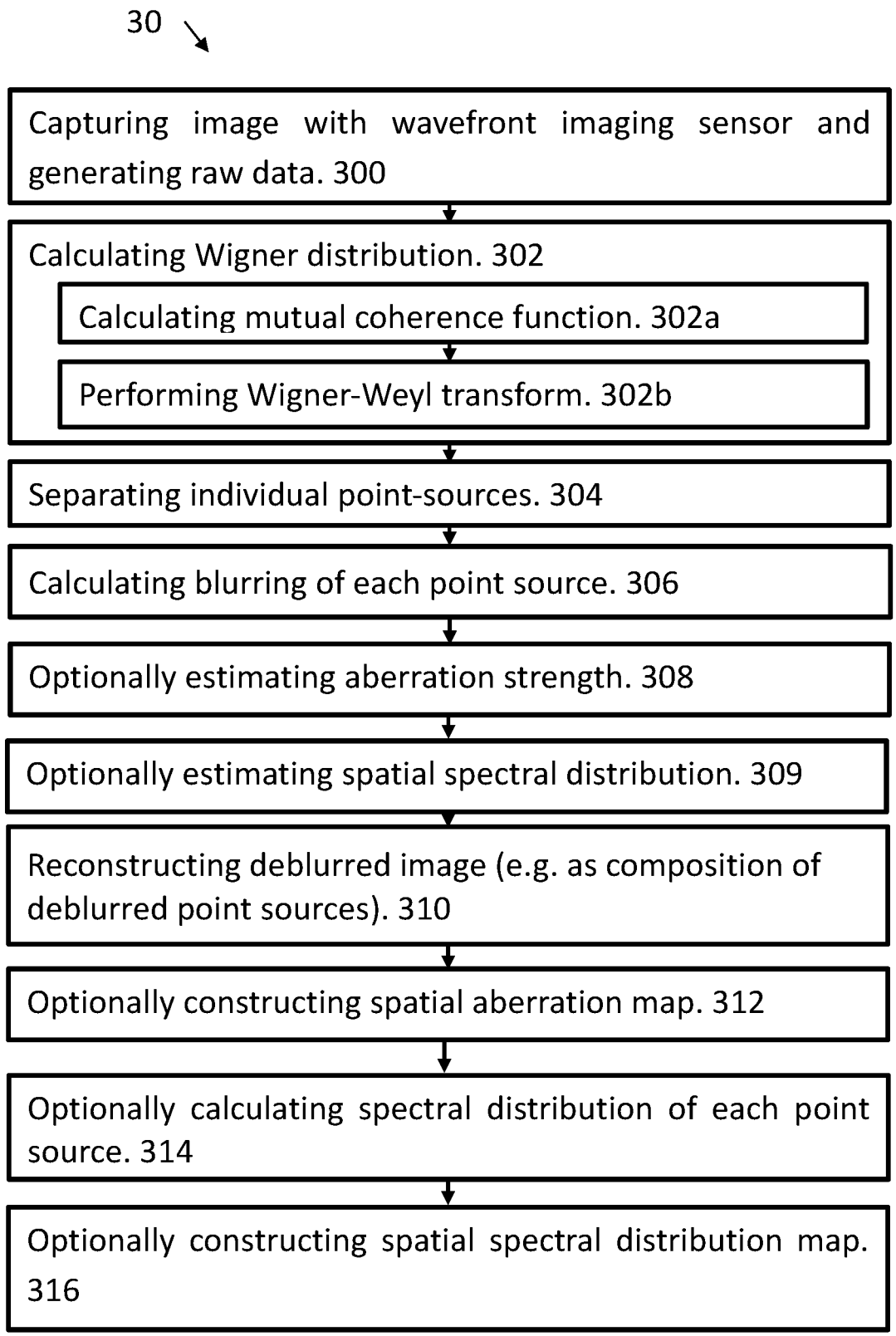

FIG. 3a is a flow chart illustrating a method 30 according to an embodiment of the invention, for digital deblurring, aberration estimation, and possibly also spectral distribution estimation using, for example, the configurations in FIGS. 1a-1b. For ease of explanation, we present the steps with reference to the imaging scenario illustrated in FIGS. 2a-2c.

Method 30 starts in operation 300 of capturing an image and generating raw data, for example, using the imaging wavefront sensor unit 106 placed near the imaging system's image plane 104 as shown in FIGS. 1a-1b. The raw data generated by imaging wavefront sensor unit 108, for example, by the detector pixel array 112 illustrated in FIG. 1b, is passed for example, to the control unit 108 shown in FIGS. 1a-1b.

Operation 300 is followed by operation 302 of calculating, for example by the control unit 108, a field property such as the Wigner distribution of the optical field that impinged on the wavefront imaging sensor 106. According to an embodiment of the invention, operation 302 is carried out by performing operation 302a, of calculating the optical mutual coherence function based on the raw data; and operation 302b, of transforming the optical mutual coherence function to the equivalent optical Wigner distribution using the Wigner-Weyl transform (equation 3).

Operation 302 is followed by operation 304 of separating individual point-sources. The coherence and angular combination information in the Wigner distribution is used to discern between the different point-sources comprising the entire imaged scene.

Operation 304 is followed by operation 306 of calculating blurring of each point source.

Operation 306 may optionally be followed by operation 308 of estimating the degree of aberration strength for each point source.

Operation 306 (or, optionally, operation 308) is followed by operation 309 of estimating spatial spectral distribution for each point source.

Operation 306 (or, optionally, operation 308 or 309) is followed by operation 310 of reconstructing the deblurred image. For example, the deblurred image is reconstructed as the composition of the deblurred point-sources.

Operation 310 may optionally be followed by operation 312 of reconstructing a spatial map of the various aberration strengths from the point-by-point aberration estimates.

Operation 310 (or, optionally, operation 312) optionally be followed by operation 314 of calculating spectral distribution of each point source.

Operation 314 may optionally be followed by operation 316 of reconstructing a spatial map of the spectral distribution of the input light from the point-by-point spectral distribution estimates.

FIG. 3b is a flow chart illustrating a method 34 according to an embodiment of the invention, for spectral distribution estimation using, for example, the configurations in FIGS. 1a-1b. For ease of explanation, we present the steps with reference to the imaging scenario illustrated in FIGS. 2a-2c.

Method 34 starts in operation 340 of capturing an image and generating raw data, for example, using the imaging wavefront sensor unit 106 placed near the imaging system's image plane 104 as shown in FIGS. 1a-1b. The raw data generated by imaging wavefront sensor unit 108, for example, by the detector pixel array 112 illustrated in FIG. 1b, is passed for example, to the control unit 108 shown in FIGS. 1a-1b.

Operation 340 is followed by operation 342 of calculating, for example by the control unit 108, a field property such as the Wigner distribution of the optical field that impinged on the wavefront imaging sensor 106. According to an embodiment of the invention, operation 342 is carried out by performing operation 342a, of calculating the optical mutual coherence function based on the raw data; and operation 342b, of transforming the optical mutual coherence function to the equivalent optical Wigner distribution using the Wigner-Weyl transform (equation 3).

Operation 342 is followed by operation 344 of separating individual point-sources. The coherence and angular combination information in the Wigner distribution is used to discern between the different point-sources comprising the entire imaged scene.

Operation 344 is followed by operation 346 of estimating spatial spectral distribution for each point source.

Operation 346 is followed by operation 348 of reconstructing a spatial map of the spectral distribution of the input light from the point-by-point spectral distribution estimates.

Optionally, part or all of the following additional operations for aberration correction are performed: operation 350 of calculating blurring of each point source; operation 352 of estimating the degree of aberration strength for each point source; operation 354 of reconstructing the deblurred image; operation 356 of reconstructing a spatial map of the various aberration strengths from the point-by-point aberration estimates.

Without loss of generality, since the Wigner distribution and the mutual coherence matrix are mathematically equivalent and related by a change in representative basis, it is possible to carry out the method 30 or 34 for calculating the property of the field in any basis representation, each of which contains the required coherence, angular, phase and spectral information. Thus, it is possible to perform operations 302, 304 and 306 in the above method 30, or operations 342, 344 and 346 in the above method 34 in the Wigner basis, the mutual coherence basis, or in any other basis obtained as combinations of mutual coherence or Wigner distribution matrix elements.

For illustration, we give an example of a numerical simulation that elucidates the method and system performance in accordance with an embodiment of the invention.

For this example, a Siemens star type target is used as the source reference object, depicted in FIG. 4. The target (i.e., FIG. 4) has extremes of periodicity and contrast and geometrical structure. The Siemens star target performance of the optical imaging system (e.g. as in FIG. 1a or 1b) against the Siemens star target is illustrated hereafter.

Figure 7:
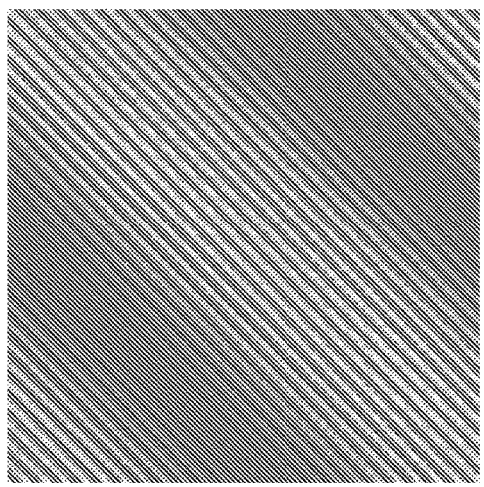
FIG. 7 illustrate another optical property of a system according to an embodiment of the invention.
Figure 8A:
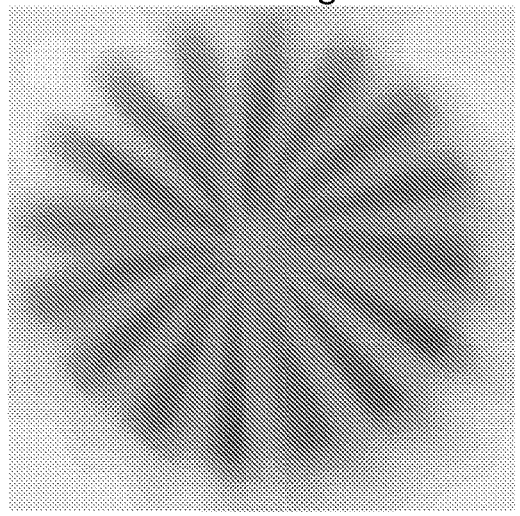
FIGS. 8a and 8b show a blurred and a deblurred images of the source reference object of FIG. 4, according to an embodiment of the invention.
Figure 8B:
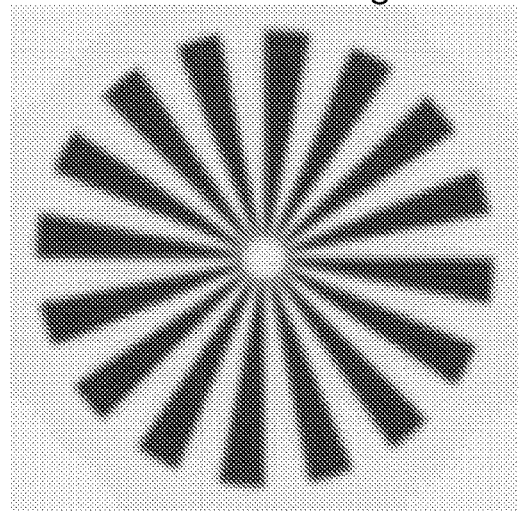

The optical imaging system (e.g. systems 10 or 12 shown in FIGS. 1a-1b) may have an aberration described by the point-spread function (PSF) 50 shown in FIG. 5a. As apparent, this is very far from a diffraction-limited spot. This corresponds to the wavefront error 52 depicted in FIG. Sb, which is almost 4 waves peak-to-peak. Imaging of the Siemens star target (FIG. 4) with such an aberrated imaging system yields the corresponding optical mutual coherence function as depicted in FIG. 6a (real part 60) and FIG. 6b (imaginary part 62). The equivalent Wigner distribution 70 is obtained from the Wigner-Weyl transform, and shown in FIG. 7. FIG. 8a shows the blurred image 80 obtained from the aberrated optical imaging system. FIG. 8b shows the deblurred image 82 that is reconstructed from the information in the Wigner distribution 70 using the method described above.

The method according to embodiments of the invention can be used to correct for optical aberrations in a wide range of applications. Several types of aberrations can be dealt with in accordance with embodiments of the invention:

Static aberrations which are induced by design and manufacturing of optical imaging systems. These static aberrations can be pre-determined by suitable calculation, measurement, and characterization of optical imaging systems.

Dynamic aberrations which may be induced either by variations in optical imaging systems due to environmental factors, or changes in the medium through which imaging is performed, such as atmospheric turbulence, ocular aberrations, etc. These dynamic aberrations are not known in advance and may vary from image to image based on changing external factors that influence the individual imaging system.

Chromatic aberrations which can be either lateral or longitudinal spectral aberrations, or combinations thereof, or higher order spectrally dependent variants. These types of chromatic aberrations can also be further classified as static or dynamic according to the above definitions.

Turning again to method 30 of FIG. 3a: according to embodiments of the invention, operation 306 of the estimation of the blurring, may take into account the classification of the aberrations as static aberrations or dynamic aberrations. In the static case, the required blurring is known in advance, and in the dynamic case it is calculated on the fly per image instance. The static aberration parameters can be calculated or measured or otherwise be determined in advance and stored in the control unit's storage unit.

The distinction between static and dynamic aberrations can also affect the number of pixels used in the wavefront imaging sensor unit (element 106 in FIGS. 1a-1b). To explain this, we need to distinguish between the image sensor's raw pixel count $N_R$ and the number of sampling points $N_N$ required according to the diffraction-limited Nyquist sampling limit given by $\Delta x = \lambda/4NA$. In conventional imaging, a well-sampled image can be obtained if the sensor's pixels are equal to or smaller than the above Nyquist limit $\Delta x = \lambda/4NA$, i.e. the number of raw pixels is at least equal to the number of Nyquist sampling points. This follows from the number of independent degrees of freedom in the intensity of the optical field at the image plane. The number of independent degrees of freedom is described by the number of Nyquist sampling points $N_N$. Thus, to fully account for these degrees of freedom, they need to be sampled with at least $N_R \geq N_N$ sampling points.

This rationale carries over to the design of the wavefront imaging sensor (e.g. element 106 in FIGS. 1a-1b). If all aberrations are static and known in advance, then the number of unknown degrees of freedom is $N_N$. Thus, the number of required raw pixels should be at least the number of Nyquist sampling points $N_R \geq N_N$. If, however, dynamic aberrations are to be considered, then additional unknown degrees of freedom are present. Each type of dynamic aberration $A_i$, e.g. power, coma, astigmatism, etc., is related to a set of new degrees of freedom numbering $N_A^i$. The assumed spatial variation of each aberration is related to the value of each $N_A^i$: for a spatially invariant aberration— $N_A^i = 1$; for a dynamic aberration that can assume arbitrary strength values at any point on the image plane—$N_A^i = N_N$; For an aberration with slow spatial dependence—$N_A^i < N_N$.

Thus, to fully account for the image degrees of freedom and the dynamic aberrations, the wavefront imaging sensor requires at least $N_R \geq N_N + \Sigma_i N_A^i$, where $1 \leq N_A^i \leq N_N$, depending on each dynamic aberration's spatial variability. Naturally, taking an excess of raw pixels increases redundancy and can improve the wavefront imaging sensor's robustness and SNR.

To obtain a higher pixel count according to the above relation, the actual raw pixels need to be smaller than the Nyquist limit $\Delta x = \lambda/4NA$. This is schematically illustrated in FIGS. 9a-9b. FIG. 9a shows the Nyquist sampling grid 90. FIG. 9b shows the raw pixel sampling grid 92. For an ordinary imaging sensor this would just imply oversampling of the optical image, yielding no new information. However, for the wavefront imaging sensor according to embodiments of the invention, for example as show in FIG. 1b, the optical modulator creates new optical information that can be sampled by the image sensor detector array (e.g. element 112 in FIG. 1b), yielding the raw data, and this new information is used to perform the deblurring as well as estimation of dynamic aberration strength as described above.

The wavefront imaging sensor (e.g. element 106 in FIGS. 1a-1b) can also be used in the regime where $N_R < N_N$. In this case it functions as an anti-aliasing filter, in addition to performing static aberration corrections, yielding deblurred images that have lower resolution than the Nyquist limit, with output resolution $N_O$ (the number of pixels in the output image) When used with dynamic aberrations in the regime $N_R < N_N + \Sigma i N_A^i$ the anti-aliasing effect is still present, again yielding deblurred images whose resolution is below the Nyquist limit $N_O < N_N$.

It is also possible to calculate chromatic field properties (such as spectral bands or color channels in the output image) at an output resolution $N_O$ lower than the number of Nyquist sampling points $N_N$. In these cases, for extracting $N_C$ chromatic field properties (e.g. spectral bands) at an output resolution of $N_O < N_N$ points, we require that $N_C \times N_O \leq N_R$, the image sensor's raw pixel count.

In embodiments of the invention, which are based, for example, on the wavefront imaging sensor described in PCT Patent Publication WO/2018/185740, the encoder unit cells are related to the Nyquist sampling grid, with optionally a non-integer ratio between the size of the unit cells and the Nyquist grid. The ratio between the size of the unit cells and the Nyquist grid depends on the degree of sampling required, which can be well-sampled for a 1:1 ratio, oversampled when the unit cells are smaller than the Nyquist grid, and undersampled when the unit cells are larger than the sampling grid. The number of subpixels within each unit cell may be a fixed integer, and the total number of raw data pixels may equal the number of unit cells times the number of subpixels per unit cell.

It is also possible to recover well sampled mutual coherence and Wigner distribution data if the unit cells are larger than the Nyquist grid, but the total number of raw data pixels are in accordance to the above sampling relations.

It should also be noted that the encoder unit cells, for example as described in PCT Patent Publication WO/2018/185740 are described as periodic. However, in some embodiments, it is possible to use a quasi-periodic or non-periodic structure to account for optical properties that are spatially dependent within the required field of view (FOV). For example, the encoder's pitch can be adjusted to account for the variation of the chief-ray angle (CRA) across the FOV. In addition, the degree and type of aberrations may vary across the FOV, requiring a different optimal optical encoder/modulator design per location in the FOV. The design of the modulator can vary according to these requirements, yielding a quasi-periodic, or non-periodic design.

Thus, according to embodiments of the invention, the optical modulator unit (e.g. element 110 in FIG. 1b) may comprise a plurality of unit cells (not shown in FIG. 1b), and the image sensor detector array unit 112 may comprise an array of sensor cells (not shown in FIG. 1b); the array of sensor cells of element 112 may define a plurality of sensor sub-array unit cells (not shown in FIG. 1b), each sensor sub-array corresponding to a unit cell of said plurality of the unit cells of the optical modulator unit 110; and the optical modulator unit 110 is to apply pre-determined modulation to input light collected by the image sensor unit 112. Each unit cell of the optical modulator unit 110 may direct a portion of the collected input light incident thereon onto sensor sub-array unit cell corresponding therewith and one or more neighboring sensor sub-array unit cells within a pre-determined proximity region.

FIGS. 10a-10d schematically illustrate various implementations of an optical modulator unit 110 with a periodic cell arrangement. The invention is not limited by the specific cell arrangement of the optical modulator unit 110.

FIG. 10a is a binary design with one disk unit per unit cell. The disk can use either phase or amplitude modulation or a combination of both. It should be noted that in some cases phase modulation is preferable since it does not induce loss of light, i.e. 100% of photons reach the underlying sensor pixels. Typically, the disk can have a fill factor of 25% to 75%, and phase modulation can be from 90 to 270 degrees at the design wavelength.

FIG. 10b depicts a multi-level design consisting of concentric rings. The rings can have equally spaced radii, or with other increments. Again, phase or amplitude modulation is possible, or a combination of both.

FIGS. 10c and 10d depict binary disk or multi ring designs with two disks/sets of rings per unit cell, arranged on the edges of the unit cells. In effect, these are equivalent to the designs of FIGS. 10a and 10b rotated by 45 degrees and shrunk by a factor of $\sqrt{2}$.

Figure 11A:
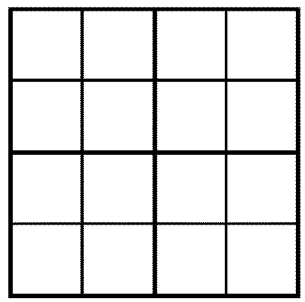
FIGS. 11a-11b schematically illustrates other aspects of an optical modulator unit according to embodiments of the invention.
Figure 11B:
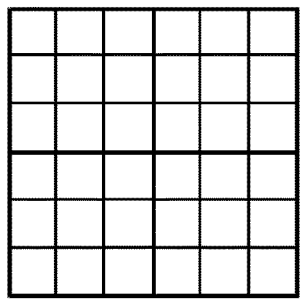

FIGS. 11a and 11b depict a relationship between the unit cells of the optical modulator unit 110 and the corresponding sensor sub arrays of the detector array 112 according to an embodiment of the invention. In FIG. 11a there are 2×2 sensor sub array pixels per unit cell, while in FIG. 11b there are 3×3 sensor sub array pixels per unit cell. Of course, it is possible to use higher M×N pixel counts in the sensor sub arrays, and the invention is not limited by the number of pixels in the optical modulator unit 110 and the detector array 112.

We note that even if an optical modulator unit cell is larger than the Nyquist limit $\Delta x=\lambda/4NA$, diffraction limited imaging resolution can be obtained as long as the raw pixel count $N_R$, as determined by the number of sub array pixels times the number of unit cells, is sufficient to ensure $N_R \geq N_N$ for recovery of the image, or $N_R \geq N_N + \Sigma_i N_A^i$ in the presence of dynamic aberrations.

Figures 12A, 12B:
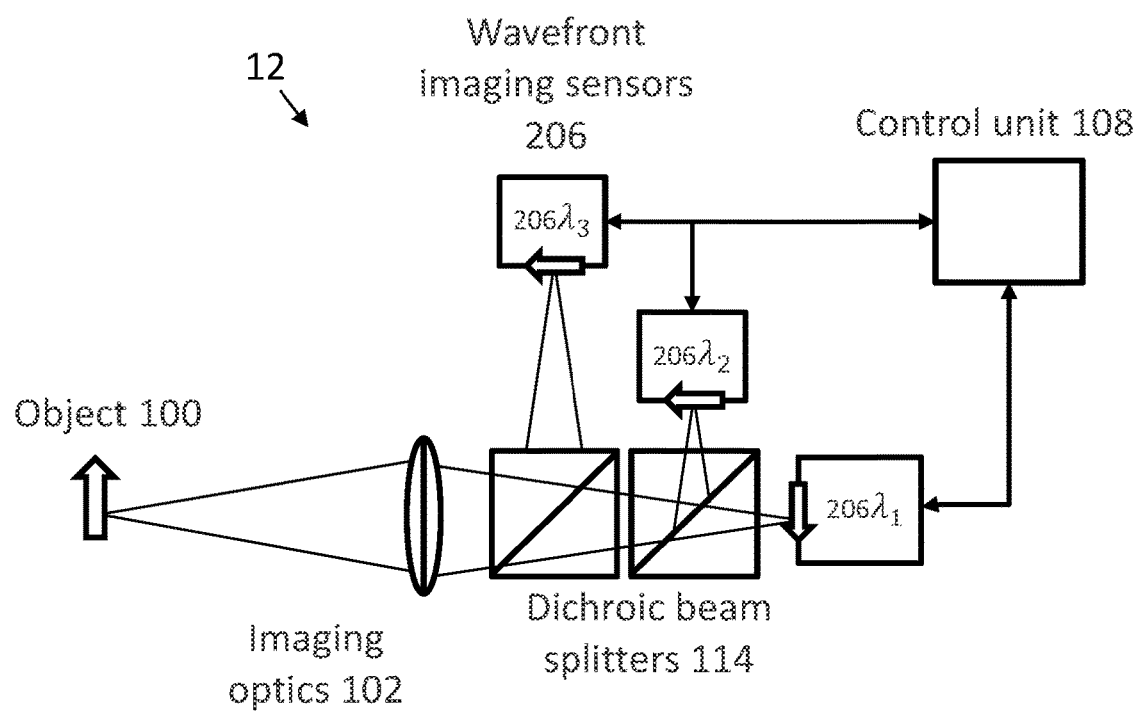
FIG. 12a schematically illustrate an aspect of a wavefront imaging sensor according to embodiments of the invention.
FIG. 12b is a block diagram of a system according to embodiments of the invention.

Chromatic aberrations may be treated using a wavefront imaging sensor designed with the required spectral sensitivity bands, using techniques known in the art. One technique can use conventional color-filter arrays, such as a Bayer filter. A non-limiting example is provided in FIG. 12a, where each number represents a different spectral band filter. FIG. 12b schematically illustrate an optical system 12 according to an embodiment of the invention. The system 12 includes elements 100, 102, 104, 108 as discussed with reference to FIGS. 1a-1b. System 12 further comprises a multi-sensor configuration 206—including wavefront imaging sensors $206\lambda_1$-$206\lambda_3$ with appropriate dichroic or other beam splitters 114, providing spectral filtering. The spectral sensitivity bands can be implemented by using a multi-sensor configuration 206. Other possible configurations can include combinations of dichroic or other beam splitters and spectral filters. Each spectral element can be treated with a separate Wigner distribution, and a combined spectrally sensitive deblurring is then applied.

It should be noted that the number of total raw pixels should include the required degrees of freedom as explained above and also take into account the spectral bands. According to one embodiment, the number of raw pixels required for a single spectral band is replicated for all spectral bands, and this can be manifest in the plurality of raw pixels used in conjunction with a color filter array, such as that depicted in FIG. 12a. According to another embodiment, if a multi-sensor configuration is used in accordance with the example of FIG. 12b, then each sensor 206 should include an appropriate number of raw pixels sufficient to cover the required degrees of freedom for the relevant spectral band.

According to embodiments of the invention, Hyperspectral Imaging (HSI) is performed using, for example, the systems illustrated in FIGS. 1a, 1b, and 12b. Hyperspectral imaging (HSI) is a technique that analyzes a wide spectrum of light instead of just assigning primary colors (red, green, blue) to each pixel. The light striking each pixel is broken down into many different spectral bands in order to provide more information on what is imaged.

According to embodiments of the invention, hyperspectral imaging is realized by providing a degree of redundancy in the total number of raw sensor pixels with respect to the measured spectral bands and the number and type of aberrations taken into consideration. The total number of raw sensor pixels is selected to be higher than the number of the measured spectral bands and takes into account the number and type of aberrations to be estimated.

For example, by using a 3×3 (9) raw pixels per Nyquist pixel, there is enough redundancy to extract intensity in 8 spectral bands and 1 additional channel of depth measurement or aberration estimation Under such conditions, it is possible to extract Wigner distributions for additional spectral bands that are either interpolated or extrapolated from the actual spectral filters used. This can enable hyperspectral imaging with a relatively simple color filter array or dichroic prism configuration. For example, for an RGB Bayer filter it is possible to extract hyperspectral imaging data for additional spectral bands in the red-green and green-blue spectral regions, as well as extrapolating to refined spectral sampling towards the violet and red regions of the spectrum.

Figure 13A:
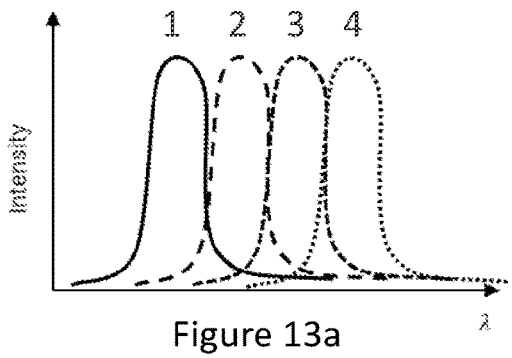
FIG. 13a schematically illustrates spectral band filters according to an embodiment of the invention.

FIG. 13a schematically illustrates four spectral band filters 1-2-3-4, corresponding to a color filter array arrangement such as illustrated in FIG. 12a, or a dichroic prism configuration as illustrated in FIG. 12b. The spectral information can be refined within each one of the spectral bands as described above, yielding spectral information at more than four wavelengths.

Additionally, with enough redundancy in total raw pixels, the spectral information can be extracted over a wide spectral band, for example the entire visible range, 400-700 nm or even beyond, e.g. into the ultra-violet or infra-red spectral regions. This can enable full color RGB imaging, multi-spectral imaging or hyper-spectral imaging without the use of spectral filters or color filter arrays of any kind, greatly increasing collection efficiency since no photons are lost. Such a sensor is useful in low-light situations.

According to embodiments of the invention, the sensor is configured to capture standard RGB imaging in the visible range (for example, 400-700 nm) as well as near infrared (IR) light. The near infrared (IR) light may be, for example, in the range of 700-1000 nm or even beyond, in the SWIR range, depending on the underlying sensor pixel spectral sensitivity). Combined RGB+IR sensing is useful to various applications involving unobtrusively flood IR illumination. For example, combined RGB+IR sensing allows to capture full color images, while illuminating the scene with invisible flood IR to enhance low-light performance. According to another example, the scene is illuminated with an invisible IR dot pattern for enhancement of depth imaging.

Figure 13B:
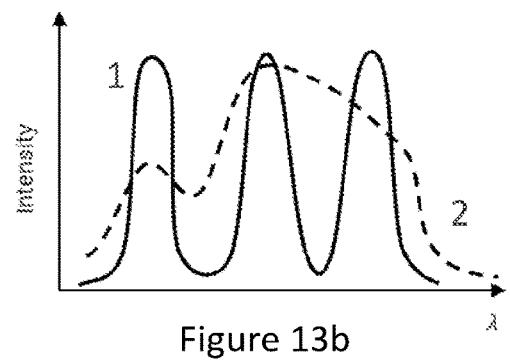
FIG. 13b schematically illustrates spectral distributions according to an embodiment of the invention.

There may arise situations where using a wide spectral band can induce ambiguities in extraction of spectral data. These ambiguities may be surmounted by using a "comb-like" spectral filter that divides the spectrum reaching the sensor into a series of narrower spectral bands that are distinct from each other, such as depicted in FIG. 13b, spectral distribution 1. With reference to the system shown in FIG. 12b, this spectral filter is applied to the entire image, and can be positioned at any place in the optical system 12 or as part of the image sensor 206. Spectral disambiguation can also be affected by other spectral filters with different spectral patterns besides the comb pattern depicted here, for example spectral distribution 2 in FIG. 13b.

Without loss of generality, control of the spectral content reaching the sensor 206 as described above and depicted in FIG. 12b, FIGS. 13a and 13b, can be affected by using suitable illumination sources in conjunction or in lieu of the spectral filters to achieve the same effect. For example, narrow band illumination sources such as LEDs can be used to illuminate RGB or other spectral distributions. The spectral content of the illumination sources can be changed sequentially, essentially leading to a setup equivalent to that shown in FIGS. 12b and 13a, or concurrently, as shown in FIG. 13b and described above.

The ability to digitally correct optical aberrations can relax design and manufacturing constraints of imaging optics systems, potentially leading to lower cost, smaller size, enhance operating parameters, or increased robustness to environmental factors. The simplification of the optics can be manifest, according to embodiments of the invention, as various combinations of one or more from a group consisting of the following operating parameters:

A reduction in the number of refractive and reflective optical elements: due to a larger aberration latitude, the requirement for complex combinations of mutually compensating optical elements is reduced.

Simpler optical surfaces, i.e. spherical surfaces can be used: the optical design can be simplified to utilize spherical surfaces in lieu of aspheric surfaces or freeform surfaces.

Lower cost materials used for the optical elements: reduce the need for special materials, which may be more costly or require more expensive manufacturing processes.

Shorter optical path: the reduction in elements can lead to a shorter optical path, optionally in conjunction with faster optics, see below.

Faster optics (lower f/#, higher NA): relaxed aberration tolerances can enable a larger aperture or shorter focal length to be used. In microscopy, this can enable a higher numerical aperture (NA) to be obtained.

Relaxed manufacturing tolerances: these can be manifest as wider tolerances for individual optical elements, surfaces, or materials, leading to higher yield or lower cost.

Relaxed alignment tolerances: a wider latitude for misalignment of optical elements can simplify mounting and alignment procedures.

Relaxed system stability and repeatability requirements: the system can accommodate a wider range of environmental factors such as thermal, pressure, shock that can affect alignment and performance parameters of optical elements.

Extended focus range: compensation for defocus blurring to enable an extended depth of focus range.

Larger field of view: in many cases an optical system's aberrations increase towards the edge of the field of view. Relaxing aberration tolerances can allow for a larger field of view.

Accommodation of stronger field curvature: an extended focus range can allow for stronger field curvature and optionally a larger field of view.

Larger working distance: in microscope objectives, the large working distance usually entails a large and complex design to overcome aberrations. The ability to digitally correct aberrations can enable a simpler design for a given working distance, or an increase in working distance, or both.

Microscope slide cover glass, sample dishes, and volumetric chambers: allow microscope objective designs to use relaxed tolerances on cover glass slips for microscope slides, or thicker slips. It can also allow inverted microscopes to work with higher NA and better penetration into sample dishes. It also allows work with thicker slides or sample chambers. Slides or sample chambers with volumetric or microfluidics channels and manipulation capabilities may be used.

Immersion objectives: increased tolerances for index matching, negate the requirement for index adjusting ring on immersion objectives.

RGB color, multi-spectral or hyper-spectral imaging: ability to perform real-time, single snapshot RGB color, multi-spectral or hyper-spectral imaging without use of a color filter array. This can increase light sensitivity by several factors since no photons are filtered out, and all of them reach the detector units' pixel array. This capability can be used in conjunction with the deblurring capabilities described above.

Many optical imaging systems have facilities to adjust various imaging parameters, such as controlling the aperture stop, changing focus, and changing focal length with a zoom mechanism. According to embodiments of the invention, if these mechanisms are repeatable to the required degree, then the changes they affect in the imaging system unit can be pre-determined and stored in the control unit's storage unit as various sets of static aberrations, each such set corresponding to a specific imaging parameter configuration.

According to other embodiments of the invention, in the interest of simplification and cost reduction, certain optical imaging parameter mechanisms may have looser repeatability tolerances, which can be compensated using dynamic aberration deblurring.

The ability to calculate dynamic aberration strength at each point in the image plane may be utilized to estimate depth at each point in the image plane, as well as to perform digital deblurring to compensate for defocus blurring and thus obtain an extended depth of focus range. In this scenario, the relevant aberration is power, which depends on the distance from the imaging system to each point in the object space. The spatial map of the power aberration strength is directly related to the depth map, and the deblurring capabilities of the algorithm may restore diffraction-limited imaging resolution also for portions of the image that were originally out of focus. In addition, for a specific optical imaging system, and its characteristic aberrations, the distance of each point in the object space may induce other aberrations beyond power, e.g. spherical aberration or other aberrations. Information regarding these additional aberrations may also be used to augment the depth estimation of each point source in the object space.

Without loss of generality, this scheme can be extended according to embodiments of the invention, to work over a wide spectral range, where the chromatic power aberration is used to estimate depth, and the wavefront imaging sensor can use one of the configurations depicted in FIGS. 10a-10b or other configurations. According to embodiments of the invention, the system can also accommodate static aberrations that are present in the optical imaging system.

The depth estimation may be used in conjunction with simplified imaging optics, according to embodiments of the invention.

According to embodiments of the invention, to perform digital adaptive optics, the dynamic aberration at each point in the image plane is calculated to accommodate various degrees of aberrations beyond power. Digital adaptive optics is used to perform digital deblurring and restore diffraction-limited imaging resolution for situations where aberrations cannot be known in advance.

The aberrations cannot be known in advance for example, in situations where the aberrations arise from various environmental factors that affect the imaging system unit in a non-predictable manner, such as thermal or pressure changes, shock, airflow within the optical system, sag of optical elements under their own weight, etc. External environmental factors can also come into play, such as imaging through atmospheric turbulence. In many biological applications, microscopic imaging of bulk tissue, either in vivo or in the lab, is limited due to the aberrations induced by light passing through the biological tissue. In microscopic ophthalmological imaging through a subject's eye, aberrations in the cornea and lens cause a substantial reduction in image sharpness and quality.

In the current state of the art, these types of aberrations are partially corrected using complex, cumbersome and expensive adaptive optics systems. Such systems are very complex to integrate into existing imaging systems, requiring modification of the optical path to incorporate the wavefront sensor and the wavefront modulation element, usually in the form of additional optical relays and beam-splitters.

Many adaptive optics systems are designed so that both the wavefront sensor and the wavefront modulation element lie at or near the imaging system's pupil plane, thereby both sampling and correcting the optical wavefront aberration in a uniform manner across the entire imaging field. Spatially dependent adaptive optics correction is usually performed in scanning optical imaging systems, further complicating overall system design.

In many cases an additional "guide-star" illumination system is required to provide a sufficient feedback signal for the wavefront sensor, further complicating the system and limiting its usefulness and operational envelope.

Dynamic aberration correction according to embodiments of the invention, allows the original imaging system to be used in conjunction with the wavefront imaging sensor, leading to an overall much simpler optical system.

According to embodiments of the invention, it is possible to provide spatially dependent deblurring, a feat that is extremely complicated using conventional adaptive optics systems.

According to further embodiments of the invention, the implementation of embodiments of the current invention obviates the use of a "guide-star", leading to further simplification.

According to embodiments of the invention, for example, in situations with low light levels, it is possible to augment the invention with a "guide star" in order to improve SNR for the digital deblurring algorithm.

According to embodiments of the invention, digital adaptive optics can be implemented to compensate for changes in the optical imaging system due to environmental factors, as well as compensate for blurring due to external factors that affect the imaging medium.

According to embodiments of the invention, the digital optical aberration correction system can be incorporated into existing adaptive optics imaging systems, where the wavefront imaging sensor replaces the conventional imaging sensor in the adaptive optics imaging system, or is provided in addition to such a conventional imaging sensor. This can provide the "final-mile" for aberration correction, compensating for residual aberration errors left by the adaptive optics system, and also allowing for simpler compensation of spatially dependent aberrations. Such a configuration may be used with or without a "guide star".

Figure 14:
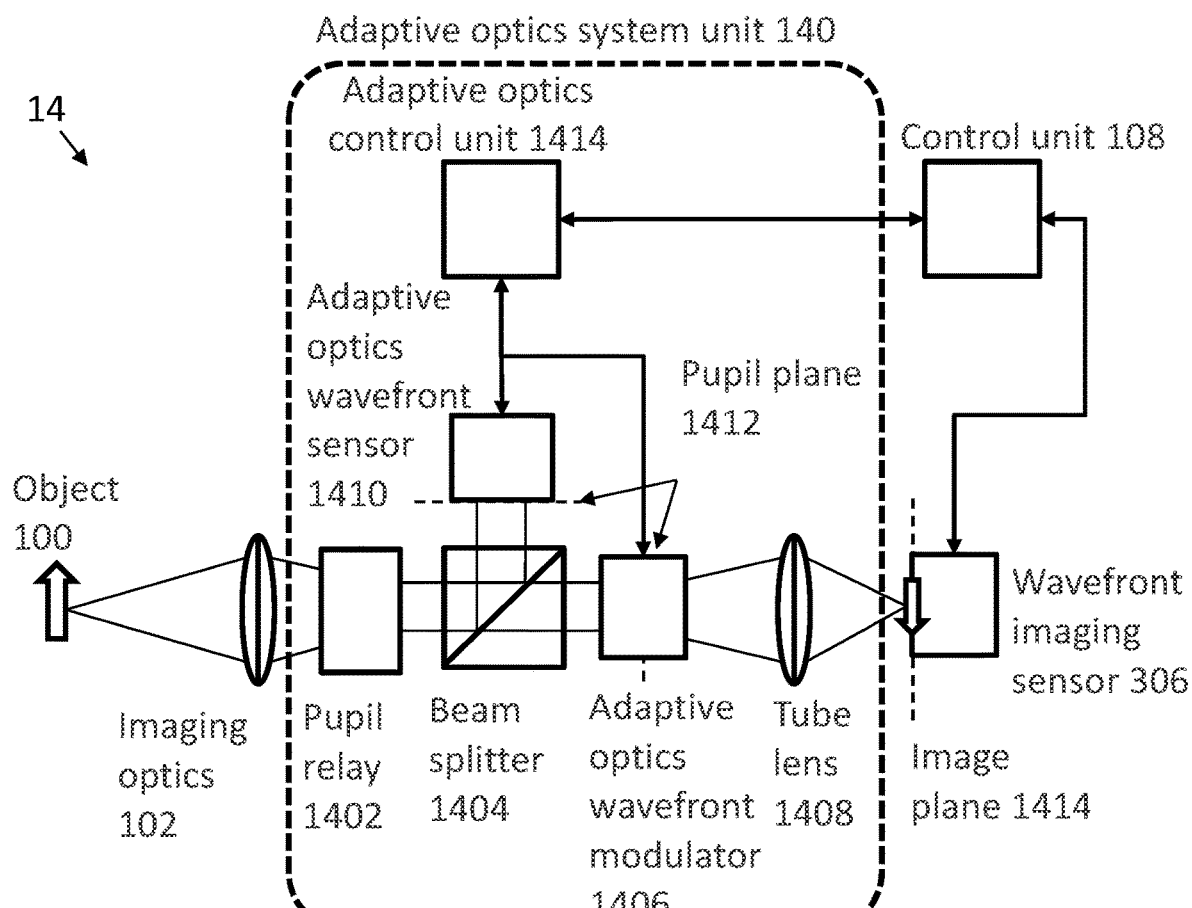
FIG. 14 is a block diagram that schematically illustrates a digital optical aberration correction system in accordance with an embodiment of the invention.

FIG. 14 is a schematic block diagram for an aberration correction system 14 having an adaptive optics system unit 140 according to embodiments of the invention. The adaptive optics system unit 140, enclosed by dashed box, is illustrated in a general manner. According to embodiments of the invention, the adaptive optics system unit 140 contains a wavefront sensor 1410 and a wavefront modulator 1406 situated near the imaging system's pupil plane 1412. This may entail an extended optical path that includes a pupil relay 1402 and tube lens 1408. The adaptive optics wavefront sensor 1410 provides feedback to drive the wavefront modulator 1406 under the control of the adaptive optics control unit 1414. Without loss of generality, FIG. 14 illustrates an adaptive optics system where the adaptive optics wavefront sensor 1410 is situated to measure the raw wavefront before wavefront correction by the wavefront modulator 1406. There exist other adaptive optics systems configurations known in the art where the adaptive optics wavefront sensor 1410 measures the residual wavefront error after correction by the wavefront modulator 1406. This design variation of the adaptive optics system, and others like it, are within the scope of the invention, and the adaptive optics system described in FIG. 14 serves as an example for illustrative purposes only.

According to embodiments of the invention, the adaptive optics wavefront imaging sensor 1410 is located at the system's image plane 1414 in lieu of the imaging sensor 206. The wavefront imaging sensor 306 and control unit 108, according to embodiments of the invention, for example as discussed with reference to FIGS. 1a, 1b, 3, 12b, can correct the residual aberrations left by the adaptive optics systems unit 140 and also compensate for spatial dependent blurring.

According to embodiments of the invention, the control unit 108 can function independently of the adaptive optics system unit 140.

According to other embodiments, the control unit 108 can also use information from the adaptive optics wavefront sensor 1410 to provide a coarse measure of the wavefront aberrations and then perform the fine, possibly spatially-dependent, digital adaptive optics correction as described above with reference to FIG. 3.

The digital adaptive optics system 14 can be used to provide depth estimation as well as being used in conjunction with the simplified optics scheme described previously.

Embodiments of the invention can be used in various applications.

According to embodiments of the invention, a digital aberration correction system may be used in a camera with shorter lens track and a reduced number of optical elements, e.g. a mobile phone camera that does not protrude from a phone case, a compact camera for wearable devices, drones, and robots.

According to embodiments of the invention, a digital aberration correction system may be used in a camera with RGB, multi-spectral or hyper-spectral capabilities with no color filter array for increased light sensitivity, and possibly also digital deblurring and extended depth of field capabilities.

According to embodiments of the invention, a digital aberration correction system may be used in a camera that is hidden behind a display panel, such as in a mobile phone, or display screen in a vehicle. The digital aberration correction can compensate for aberrations due to imaging through the display device layer. In addition, color RGB, multi-spectral or hyper-spectral imaging can be obtained without a color filter array for increased light sensitivity, compensating for light loss and possible spectral imbalance due to imaging through display device.

According to embodiments of the invention, a digital aberration correction system may be used in a simplified ophthalmoscope with higher imaging resolution. The simplified ophthalmoscope may allow for simpler area-imaging instead of scanning configurations. The simplified ophthalmoscope may provide improved resolution of retinal scan for biometric identification purposes. The simplified ophthalmoscope may be used in lieu of a conventional adaptive optics system or as "final-mile" fine correction when added to an existing system.

According to embodiments of the invention, a digital aberration correction system may be used in various combinations that can be used in microscopy. A microscope employing the digital aberration correction system according to embodiments of the invention, may provide one or more of the following benefits: simplified objective design, wider field of view; Larger working distance; Enhanced operating parameters with respect to sample handling, such as slides, coverslips, volumetric chambers, microfluidic channels; Increased immersion objective working tolerances; Extended focus; Digital aberration correction in turbid media.

The digital aberration correction system according to embodiments of the invention may be implemented as a part of a conventional imaging microscope; as part of a confocal microscope; or be used for a light-sheet microscope.

The digital aberration correction system according to embodiments of the invention may be used in a microscope for applications requiring RGB color, multi-spectral, or hyper-spectral sensitivity, especially for non-linear imaging.

The digital aberration correction system according to embodiments of the invention may be used in a microscope for brightfield, darkfield, DIC, phase contrast, quantitative phase imaging and tomography, and other imaging techniques.

The digital aberration correction system according to embodiments of the invention may be used in a microscope for conventional, fluorescence, two-photon, multi-photon, non-linear techniques.

The digital aberration correction system according to embodiments of the invention may be used in lieu of conventional adaptive optics system, or as "final-mile" fine correction when added to an existing adaptive optics system.

The digital aberration correction system according to embodiments of the invention may be used for long-range surveillance and imaging systems. Example are airborne, spaceborne, marine, terrestrial and space telescopes and imaging systems.

Employing various embodiments of the invention, such imaging systems may use simplified, light-weight imaging optics.

Employing various embodiments of the invention, such imaging systems may provide a wider tolerance to environmental factors that affect imaging system, such as temperature, pressure, shock, and vibration.

Employing various embodiments of the invention, such imaging systems may use digital adaptive optics to correct for atmospheric turbulence and imaging system variability under environmental factors.

Employing various embodiments of the invention, such imaging systems may use digital aberration correction in lieu of conventional adaptive optics system, or as "final-mile" fine correction when added to an existing system.

The digital aberration correction system according to embodiments of the invention may be used in imaging systems for applications requiring RGB color, multi-spectral, hyper-spectral sensitivity with no color filter array for increased sensitivity.

We claim:
1. An optical system comprising:
an optical imaging unit, to form an optical image near an image plane of the optical system;
a wavefront imaging sensor located near the image plane, to provide raw digital data on an optical field and image output near the image plane; and
a control unit for processing the raw digital data and the image output to provide deblurred image output, wherein the control unit comprises a storage unit that stores instructions and a processing unit to execute the instructions to receive the image input and the raw digital data of the optical field impinging on the wavefront imaging sensor and generate a deblurred image based on an analysis of the optical mutual coherence function at the imaging plane;
wherein the wavefront imaging sensor comprises an optical modulator comprising a plurality of unit cells and being located near the image plane and an image sensor comprising an array of sensors cells located downstream of the optical modulator with respect to a general direction of propagation of input optical field through the system and configured for acquiring raw digital image output;

the array of sensor cells defining a plurality of sensor sub-array unit cells, each sensor sub-array corresponding to a unit cell of said plurality of the unit cells of the optical modulator; and wherein the optical modulator is configured to apply a pre-determined modulation to input light collected by the image sensor, providing that each unit cell of the optical modulator directs a portion of the collected input light incident thereon onto sensor sub-array unit cell corresponding therewith and one or more neighboring sensor sub-array unit cells within a pre-determined proximity region, the pre-determined modulation being at least one of a phase modulation and an amplitude modulation.

2. The optical system of any of claim 1 wherein the control unit is further to:

calculating a field property of the optical field;

discerning between point-sources in the image output based on coherence and superposition information in the field property;

for each discerned point-source, estimating its degree of blurring; and reconstructing a deblurred image as a composition of the deblurred point-sources.

3. The optical system of claim 2 wherein the field property is a Wigner distribution or an equivalent entity related to the Wigner distribution by a mathematical transformation.

4. The optical system of claim 2, wherein the wavefront imaging sensor comprises at least two image sensors, each of the at least two image sensors associated with a spectral filter and the control unit is to calculating a field property corresponding to each of the at least two image sensors, giving rise to a plurality of chromatic field properties, and to reconstructing the deblurred image based on a combination of the chromatic field properties.

5. The optical system of claim 1, wherein a raw pixel count $N_R$ of the plurality of sensor sub-array unit cells of image sensor is equal to or larger than a number of Nyquist sampling points $N_N$ of the optical modulator.

6. The optical system of claim 1, wherein the raw pixel count $N_R$ of the plurality of sensor sub-array unit cells of image sensor and the number of Nyquist sampling points $N_N$ of the optical modulator follow the relation $N_R \geq N_N + \Sigma_i N^i_A$, where $1 \leq N^i_A \leq N_N$, and wherein $N^i_A$ is indicative of a dynamic aberration's spatial variability.

7. The optical system of claim 1, wherein the control unit is configured to calculate a field property corresponding to each of the unit cells, giving rise to a plurality of chromatic field properties, and to reconstructing, based on a combination of the chromatic field properties, at least one of a group consisting of: full color RGB image, hyper-spectral image without the use of spectral filters or color filters.

8. The optical system of claim 1, wherein the control unit is configured to calculate a chromatic field property corresponding to each of the unit cells, giving rise to a plurality of chromatic field properties, and to reconstructing an output image having a number N 0 of output image pixels and a number N c of chromatic field properties, wherein N 0 is lower that the Nyquist sampling limit N and N c×N 0 (N r, the number of raw pixels.

9. The optical system of claim 2 wherein the optical field comprises multiple wavelengths, being distinct or continuous, and wherein the control unit is to perform one or both of: (1) estimating, for each discerned point-source, its spectral distribution; (2) reconstructing a spectral distribution map of the image.

10. The optical system of claim 1 wherein the control unit is further configured to perform one or more of: (1) estimating aberration strength for each discerned point-source; (2) estimating depth based on dynamic aberration strength estimated for each discerned point-source, giving rise to a spatial map of power aberration strength, and reconstructing a depth map based on a spatial map of power aberration strength; or (3) based on the depth map, restoring diffraction-limited imaging resolution for defocus portions of the image.

11. A method for digital optical aberration correction of an image formed by an imaging unit near an imaging plane of an optical system, the method comprising:

providing raw digital data on an optical field impinging on a wavefront imaging sensor located near the image plane and image output formed near the image plane; and processing, by a control unit, the raw digital data and the image output to provide deblurred image output based on an analysis of optical mutual coherence function at the image plane;

wherein the wavefront imaging sensor comprises:

an optical modulator comprising a plurality of unit cells and being located near the image plane, and an image sensor comprising an array of sensors cells located downstream the optical modulator with respect to a general direction of propagation of input optical field through the system, and configured for acquiring raw digital image output;

wherein the array of sensor cells defines a plurality of sensor sub-array unit cells, each sensor sub-array corresponding to a unit cell of said plurality of the unit cells of the optical modulator; and wherein the method further comprises:

applying, by the optical modulator, pre-determined modulation to input light collected by the image sensor, using at least one of phase modulation and amplitude modulation; and directing, by each unit cell of the optical modulator a portion of the collected input light incident thereon onto sensor sub-array unit cell corresponding therewith and one or more neighboring sensor sub-array unit cells within a pre-determined proximity region.

12. The method of claim 11, wherein a raw pixel count $N_R$ of the plurality of sensor sub-array unit cells of image sensor is equal to or larger than the number of Nyquist sampling points $N_N$ of the optical modulator.

13. The method of claim 11, wherein the raw pixel count $N_R$ of the plurality of sensor sub-array unit cells of image sensor and the number of Nyquist sampling points N of the optical modulator follow the relation $N_R \geq N_N + \Sigma_i N^i_A$, where $1 \leq N^i_A \leq N_N$, and wherein $N^i_A$ is indicative of a dynamic aberration's spatial variability.

14. The method of claim 11 further comprising:

calculating a field property of the optical field;

discerning between point-sources in the image output based on coherence and superposition information in the field property;

for each discerned point-source, estimating its blurring; and reconstructing a deblurred image as a composition of the deblurred point-sources.

15. An optical system, comprising:
an optical imaging unit, to form an optical image near an image plane of the optical system;
a wavefront imaging sensor located near the image plane and comprising an optical modulator unit and an image sensor located downstream of the optical modulator with respect to a general direction of propagation of an input optical field through the system, the image sensor comprising a pixel array defining a raw pixel count $N_R$, and configured to provide raw digital data on an optical field and image output near the image plane; and
a control unit for processing the raw digital data to provide an output image being at least one of a group consisting of: full color RGB image and hyper-spectral image;
wherein the control unit comprises a storage unit that stores instructions and a processing unit to execute the instructions to receive the raw digital data of the optical field impinging on the wavefront imaging sensor and to process said raw digital data to determine chromatic field properties based on an analysis of the optical mutual coherence function at the imaging plane and to utilize said chromatic field properties to reconstruct an output image having a number $N_O$ of output image pixels and a number $N_C$ of chromatic field properties, wherein $N_o \times N_C \leq N_R$.

16. The optical system of claim 15, wherein said control unit is further configured to estimate depth at each point in the image plane.

* * * * *